US010178902B2

(12) United States Patent
Martinez et al.

(10) Patent No.: US 10,178,902 B2
(45) Date of Patent: Jan. 15, 2019

(54) PROTECTIVE ENCLOSURE FOR ENCASING AN ELECTRONIC DEVICE

(71) Applicant: OTTER PRODUCTS, LLC, Fort Collins, CO (US)

(72) Inventors: Alfonso Martinez, Escondido, CA (US); Oscar Lopez, Descanso, CA (US); Stephen James McFadden, San Diego, CA (US)

(73) Assignee: Otter Products, LLC, Fort Collins, CO (US)

( * ) Notice: Subject to any disclaimer, the term of this patent is extended or adjusted under 35 U.S.C. 154(b) by 195 days.

(21) Appl. No.: 15/354,719

(22) Filed: Nov. 17, 2016

(65) Prior Publication Data

US 2018/0064222 A1    Mar. 8, 2018

Related U.S. Application Data

(63) Continuation of application No. 15/354,522, filed on Nov. 17, 2016.
(Continued)

(51) Int. Cl.
| | |
|---|---|
| *A45C 13/00* | (2006.01) |
| *A45C 11/00* | (2006.01) |
| *A45F 5/00* | (2006.01) |
| *H04N 5/225* | (2006.01) |
| *H04B 1/3888* | (2015.01) |

(Continued)

(52) U.S. Cl.
CPC ............ *A45C 11/00* (2013.01); *A45C 13/002* (2013.01); *A45C 13/008* (2013.01); *A45F 5/00* (2013.01); *G03B 17/08* (2013.01); *G03B 17/56* (2013.01); *H04B 1/3888* (2013.01); *H04N 5/2252* (2013.01); *H04N 5/2254* (2013.01); *A45C 2011/002* (2013.01); *A45C 2011/003* (2013.01)

(58) Field of Classification Search
CPC ..... A45C 11/00; A45C 13/002; A45C 13/008; A45C 2011/002; A45C 2011/003; G03B 17/08; H04B 1/3888; H04N 5/2254
USPC ......................................... 206/320
See application file for complete search history.

(56) References Cited

U.S. PATENT DOCUMENTS

| | | | |
|---|---|---|---|
| 2,392,787 A | 1/1946 | Edmond | |
| 2,851,670 A | 9/1958 | Senior | |

(Continued)

FOREIGN PATENT DOCUMENTS

| | | | |
|---|---|---|---|
| DE | 29612454 U1 | 9/1996 | |
| EP | 1018680 A2 | 7/2000 | |

(Continued)

*Primary Examiner* — Steven A. Reynolds

(57) ABSTRACT

A protective enclosure for an electronic device includes a top member adapted to be removably coupled to a bottom member to enclose the electronic device. A first back engagement feature is disposed on an inside surface of a perimeter wall portion of the bottom member, and the first back engagement feature is adapted to engage a first front engagement feature disposed on an inner perimeter wall of the top member to removably secure the top member to the bottom member. A second back engagement feature is disposed on an outside surface of the perimeter wall portion of the bottom member, and the second back engagement feature is adapted to engage a second front engagement feature disposed on an outer perimeter wall of the top member to further removably secure the top member to the bottom member.

21 Claims, 20 Drawing Sheets

Related U.S. Application Data

(60) Provisional application No. 62/384,314, filed on Sep. 7, 2016.

(51) Int. Cl.
    *G03B 17/08* (2006.01)
    *G03B 17/56* (2006.01)

(56) References Cited

U.S. PATENT DOCUMENTS

| | | |
|---|---|---|
| 3,023,885 A | 3/1962 | Kindseth |
| 3,143,384 A | 8/1964 | Senior |
| 3,482,895 A | 12/1969 | Becklin |
| 3,665,991 A | 5/1972 | Gillemot et al. |
| 3,689,866 A | 9/1972 | William |
| 3,832,725 A | 8/1974 | Cook |
| 3,922,477 A | 11/1975 | Glowacz |
| 4,097,878 A | 6/1978 | Cramer |
| 4,298,204 A | 11/1981 | Jinkins |
| 4,312,580 A | 1/1982 | Schwomma et al. |
| 4,375,323 A | 3/1983 | Inagaki et al. |
| 4,383,743 A | 5/1983 | Nozawa et al. |
| 4,418,830 A | 12/1983 | Dzung et al. |
| 4,420,078 A | 12/1983 | Belt et al. |
| 4,546,874 A | 10/1985 | Kirchhan |
| 4,584,718 A | 4/1986 | Fuller |
| 4,649,453 A | 3/1987 | Iwasawa |
| 4,658,956 A | 4/1987 | Takeda et al. |
| 4,686,332 A | 8/1987 | Greanias et al. |
| 4,703,161 A | 10/1987 | McLean |
| 4,712,657 A | 12/1987 | Myers et al. |
| 4,733,776 A | 3/1988 | Ward |
| 4,762,227 A | 8/1988 | Patterson |
| 4,803,504 A | 2/1989 | Maeno et al. |
| 4,836,256 A | 6/1989 | Meliconi |
| 4,942,514 A | 7/1990 | Miyagaki et al. |
| 4,963,902 A | 10/1990 | Fukahori |
| 4,977,483 A | 12/1990 | Perretta |
| 4,994,829 A | 2/1991 | Tsukamoto |
| 5,002,184 A | 3/1991 | Lloyd |
| D316,932 S | 5/1991 | Escher |
| 5,025,921 A | 6/1991 | Gasparaitis et al. |
| D322,165 S | 12/1991 | Lloyd |
| 5,087,934 A | 2/1992 | Johnson |
| 5,092,458 A | 3/1992 | Yokoyama |
| 5,092,459 A | 3/1992 | Uljanic et al. |
| 5,175,873 A | 12/1992 | Goldenberg et al. |
| 5,177,515 A | 1/1993 | Tsukamoto |
| 5,219,067 A | 6/1993 | Lima et al. |
| 5,231,381 A | 7/1993 | Duwaer |
| 5,233,502 A | 8/1993 | Beatty et al. |
| 5,239,323 A | 8/1993 | Johnson |
| 5,239,324 A | 8/1993 | Ohmura et al. |
| 5,285,894 A | 2/1994 | Kamata et al. |
| 5,294,988 A | 3/1994 | Wakabayashi et al. |
| 5,305,032 A | 4/1994 | Arai |
| 5,336,896 A | 8/1994 | Katz |
| 5,360,108 A | 11/1994 | Alagia |
| 5,368,159 A | 11/1994 | Doria |
| 5,380,968 A | 1/1995 | Morse |
| 5,383,091 A | 1/1995 | Snell |
| 5,386,084 A | 1/1995 | Risko |
| 5,388,691 A | 2/1995 | White |
| 5,388,692 A | 2/1995 | Withrow et al. |
| D365,927 S | 1/1996 | Cho |
| 5,505,328 A | 4/1996 | Stribiak |
| 5,508,479 A | 4/1996 | Schooley |
| 5,518,802 A | 5/1996 | Colvin et al. |
| 5,541,813 A | 7/1996 | Satoh et al. |
| RE35,318 E | 8/1996 | Warman |
| 5,548,306 A | 8/1996 | Yates et al. |
| 5,583,742 A | 12/1996 | Noda et al. |
| 5,584,054 A | 12/1996 | Tyneski et al. |
| 5,586,002 A | 12/1996 | Notarianni |
| 5,590,760 A | 1/1997 | Astarb |
| 5,610,655 A | 3/1997 | Wakabayashi et al. |
| 5,613,237 A | 3/1997 | Bent et al. |
| D378,634 S | 4/1997 | LaPere |
| 5,636,101 A | 6/1997 | Bonsail et al. |
| 5,660,566 A | 8/1997 | Ohsumi |
| 5,669,004 A | 9/1997 | Sellers |
| 5,681,122 A | 10/1997 | Burke |
| 5,707,757 A | 1/1998 | Lee |
| 5,713,048 A | 1/1998 | Hayakawa |
| 5,713,466 A | 2/1998 | Tajima |
| 5,845,803 A | 12/1998 | Saito et al. |
| 5,850,915 A | 12/1998 | Tajima |
| 5,907,721 A | 5/1999 | Schelling et al. |
| 5,946,501 A | 8/1999 | Hayakawa |
| 5,950,816 A | 9/1999 | Reid |
| 5,956,291 A | 9/1999 | Nehemiah et al. |
| 5,982,520 A | 11/1999 | Weiser et al. |
| 5,990,874 A | 11/1999 | Tsumura et al. |
| D419,297 S | 1/2000 | Richardson et al. |
| D419,768 S | 2/2000 | Richardson et al. |
| 6,031,524 A | 2/2000 | Kunert |
| 6,041,924 A | 3/2000 | Tajima |
| D424,035 S | 5/2000 | Steiner et al. |
| 6,068,119 A | 5/2000 | Derr et al. |
| 6,092,707 A | 7/2000 | Bowes |
| 6,094,785 A | 8/2000 | Montgomery et al. |
| 6,128,441 A | 10/2000 | Kamata et al. |
| 6,132,367 A | 10/2000 | Adair |
| 6,201,867 B1 | 3/2001 | Koike |
| D447,634 S | 9/2001 | Snider |
| 6,304,459 B1 | 10/2001 | Toyosato et al. |
| 6,311,017 B1 | 10/2001 | Mori |
| 6,313,982 B1 | 11/2001 | Hino |
| 6,317,313 B1 | 11/2001 | Mosgrove et al. |
| 6,349,824 B1 | 2/2002 | Yamada |
| 6,388,877 B1 | 5/2002 | Canova et al. |
| 6,396,769 B1 | 5/2002 | Polany |
| 6,398,585 B1 | 6/2002 | Fukuda |
| 6,415,138 B2 | 7/2002 | Sirola et al. |
| 6,445,577 B1 | 9/2002 | Madsen et al. |
| 6,447,140 B1 | 9/2002 | Lu |
| 6,456,487 B1 | 9/2002 | Hetterick |
| D464,196 S | 10/2002 | Parker |
| 6,471,056 B1 | 10/2002 | Tzeng |
| 6,519,141 B2 | 2/2003 | Tseng et al. |
| 6,525,928 B1 | 2/2003 | Madsen et al. |
| 6,532,152 B1 | 3/2003 | White et al. |
| 6,536,589 B2 | 3/2003 | Chang |
| 6,571,056 B2 | 5/2003 | Shimamura et al. |
| 6,574,434 B2 | 6/2003 | Matsuoto et al. |
| 6,594,472 B1 | 7/2003 | Curtis et al. |
| 6,595,608 B1 | 7/2003 | Minelli et al. |
| 6,597,865 B1 | 7/2003 | Negishi et al. |
| 6,614,423 B1 | 9/2003 | Wong et al. |
| 6,614,722 B2 | 9/2003 | Polany et al. |
| 6,616,111 B1 | 9/2003 | White |
| 6,617,973 B1 | 9/2003 | Osterman |
| 6,625,394 B2 | 9/2003 | Smith et al. |
| 6,634,494 B1 | 10/2003 | Derr et al. |
| 6,636,697 B2 | 10/2003 | Smith et al. |
| 6,646,864 B2 | 11/2003 | Richardson |
| 6,659,274 B2 | 12/2003 | Enners |
| 6,665,174 B1 | 12/2003 | Derr et al. |
| 6,667,738 B2 | 12/2003 | Murphy |
| 6,669,017 B2 | 12/2003 | Linihan |
| 6,698,608 B2 | 3/2004 | Parker et al. |
| 6,721,651 B1 | 4/2004 | Minelli |
| 6,751,552 B1 | 6/2004 | Minelli |
| 6,760,570 B1 | 7/2004 | Higdon |
| 6,778,388 B1 | 8/2004 | Minelli |
| 6,785,566 B1 | 8/2004 | Irizarry |
| 6,819,866 B2 | 11/2004 | Silva |
| 6,822,161 B2 | 11/2004 | Komatsu et al. |
| 6,822,640 B2 | 11/2004 | Derocher |
| 6,844,845 B1 | 1/2005 | Whiteside et al. |
| 6,848,930 B2 | 2/2005 | Fukuda |
| 6,913,201 B1 | 7/2005 | Wagner et al. |
| 6,914,774 B1 | 7/2005 | Albertini et al. |
| D507,871 S | 8/2005 | DiMarchi et al. |

(56) References Cited

U.S. PATENT DOCUMENTS

| | | |
|---|---|---|
| 6,953,126 B2 | 10/2005 | Parker et al. |
| 6,954,405 B2 | 10/2005 | Polany et al. |
| 6,955,293 B1 | 10/2005 | Katsanevas |
| 6,971,517 B2 | 12/2005 | Chen |
| 6,975,888 B2 | 12/2005 | Buesseler et al. |
| 6,980,777 B2 | 12/2005 | Shepherd et al. |
| 6,983,130 B2 | 1/2006 | Chien et al. |
| 6,987,527 B2 | 1/2006 | Kossin |
| 6,992,659 B2 | 1/2006 | Gettemy |
| 6,995,976 B2 | 2/2006 | Richardson |
| D516,807 S | 3/2006 | Richardson et al. |
| 7,025,274 B2 | 4/2006 | Solomon et al. |
| 7,033,215 B2 | 4/2006 | Kobayashi |
| 7,046,230 B2 | 5/2006 | Zadesky et al. |
| 7,050,712 B2 | 5/2006 | Shimamura |
| 7,050,841 B1 | 5/2006 | Onda |
| 7,054,441 B2 | 5/2006 | Pletikosa |
| 7,061,762 B2 | 6/2006 | Canova et al. |
| 7,069,063 B2 | 6/2006 | Halkosaari et al. |
| 7,072,467 B2 | 7/2006 | Ono |
| 7,082,264 B2 | 7/2006 | Watanabe et al. |
| 7,085,542 B2 | 8/2006 | Dietrich et al. |
| 7,106,959 B2 | 9/2006 | Sato |
| D530,079 S | 10/2006 | Thomas et al. |
| 7,146,701 B2 | 12/2006 | Mahoney et al. |
| 7,158,376 B2 | 1/2007 | Richardson et al. |
| 7,180,735 B2 | 2/2007 | Thomas et al. |
| 7,194,086 B2 | 3/2007 | Pletikosa |
| 7,194,202 B2 | 3/2007 | Funahashi et al. |
| 7,194,291 B2 | 3/2007 | Peng |
| D542,524 S | 5/2007 | Richardson et al. |
| 7,230,823 B2 | 6/2007 | Richardson et al. |
| 7,236,588 B2 | 6/2007 | Gartrell |
| 7,255,228 B2 | 8/2007 | Kim |
| 7,263,032 B2 | 8/2007 | Polany et al. |
| 7,312,984 B2 | 12/2007 | Richardson et al. |
| 7,327,841 B2 | 2/2008 | Schreiber et al. |
| 7,341,144 B2 | 3/2008 | Tajiri et al. |
| 7,343,184 B2 | 3/2008 | Rostami |
| 7,352,961 B2 | 4/2008 | Watanabe et al. |
| 7,362,570 B2 | 4/2008 | Su |
| 7,365,281 B2 | 4/2008 | Yamaguchi et al. |
| 7,366,555 B2 | 4/2008 | Jokinen et al. |
| 7,369,881 B2 | 5/2008 | Tsujimoto |
| 7,389,869 B2 | 6/2008 | Mason |
| 7,400,917 B2 | 7/2008 | Wood et al. |
| D574,819 S | 8/2008 | Andre et al. |
| D575,056 S | 8/2008 | Tan |
| 7,409,148 B2 | 8/2008 | Takahashi et al. |
| 7,418,278 B2 | 8/2008 | Eriksson et al. |
| 7,428,427 B2 | 9/2008 | Brunstrom et al. |
| 7,436,653 B2 | 10/2008 | Yang et al. |
| D581,421 S | 11/2008 | Richardson et al. |
| 7,448,908 B2 | 11/2008 | Iwahori et al. |
| D582,149 S | 12/2008 | Tan |
| 7,464,813 B2 | 12/2008 | Carnevali |
| 7,464,814 B2 | 12/2008 | Carnevali |
| 7,495,659 B2 | 2/2009 | Marriott et al. |
| 7,495,895 B2 | 2/2009 | Carnevali |
| 7,499,040 B2 | 3/2009 | Zadesky et al. |
| 7,502,550 B2 | 3/2009 | Ariga |
| 7,511,956 B2 | 3/2009 | Tomioka et al. |
| 7,525,792 B2 | 4/2009 | Yokote |
| 7,535,799 B2 | 5/2009 | Polany et al. |
| D593,319 S | 6/2009 | Richardson et al. |
| 7,555,325 B2 | 6/2009 | Goros |
| D597,089 S | 7/2009 | Khan et al. |
| 7,558,594 B2 | 7/2009 | Wilson |
| 7,594,576 B2 | 9/2009 | Chen et al. |
| 7,609,512 B2 | 10/2009 | Richardson et al. |
| D603,603 S | 11/2009 | Laine et al. |
| 7,613,386 B2 | 11/2009 | Shimamura |
| 7,623,898 B2 | 11/2009 | Holmberg |
| D605,850 S | 12/2009 | Richardson et al. |
| D606,751 S | 12/2009 | Andre et al. |
| 7,630,746 B2 | 12/2009 | Holmberg |
| 7,653,292 B2 | 1/2010 | Yamaguchi et al. |
| 7,663,878 B2 | 2/2010 | Swan et al. |
| 7,663,879 B2 | 2/2010 | Richardson et al. |
| D611,478 S | 3/2010 | Richardson et al. |
| 7,679,674 B2 | 3/2010 | Nishizawa |
| 7,688,580 B2 | 3/2010 | Richardson et al. |
| 7,697,269 B2 | 4/2010 | Yang et al. |
| D616,430 S | 5/2010 | Fathollahi |
| 7,733,642 B2 | 6/2010 | Liou et al. |
| 7,755,975 B2 | 7/2010 | Pettersen et al. |
| D622,716 S | 8/2010 | Andre et al. |
| 7,772,507 B2 | 8/2010 | Orr et al. |
| 7,775,354 B2 | 8/2010 | Latchford et al. |
| 7,782,610 B2 | 8/2010 | Diebel et al. |
| 7,787,756 B2 | 8/2010 | Funahashi et al. |
| D623,180 S | 9/2010 | Diebel |
| D624,532 S | 9/2010 | Huskinson |
| 7,789,228 B2 | 9/2010 | Zenzai |
| 7,789,696 B2 | 9/2010 | Umei et al. |
| 7,801,425 B2 | 9/2010 | Fantone et al. |
| D624,908 S | 10/2010 | Huskinson |
| D624,909 S | 10/2010 | Huskinson |
| 7,850,032 B2 | 12/2010 | Carnevali et al. |
| 7,854,434 B2 | 12/2010 | Heiman et al. |
| 7,889,489 B2 | 2/2011 | Richardson et al. |
| 7,907,394 B2 | 3/2011 | Richardson et al. |
| 7,926,818 B2 | 4/2011 | Isono |
| 7,933,122 B2 | 4/2011 | Richardson et al. |
| 7,936,566 B2 | 5/2011 | Shigyo et al. |
| 7,941,196 B2 | 5/2011 | Kawasaki et al. |
| 7,944,697 B2 | 5/2011 | Hata et al. |
| 7,975,870 B2 | 7/2011 | Laule et al. |
| 7,978,092 B2 | 7/2011 | Osaka |
| 7,993,071 B2 | 8/2011 | Clawson |
| 8,004,835 B2 | 8/2011 | Conti et al. |
| 8,006,020 B2 | 8/2011 | Minoo |
| D644,636 S | 9/2011 | Richardson et al. |
| 8,024,015 B2 | 9/2011 | Araki et al. |
| 8,031,472 B2 | 10/2011 | Bicket et al. |
| 8,032,194 B2 | 10/2011 | Liu et al. |
| 8,053,668 B2 | 11/2011 | Lai et al. |
| 8,068,331 B2 | 11/2011 | Sauers et al. |
| 8,089,757 B2 | 1/2012 | Chen et al. |
| 8,101,859 B2 | 1/2012 | Zadesky |
| 8,112,130 B2 | 2/2012 | Mittleman et al. |
| 8,138,434 B2 | 3/2012 | Tang et al. |
| 8,160,657 B2 | 4/2012 | Perriello et al. |
| 8,164,899 B2 | 4/2012 | Yamaguchi et al. |
| 8,167,126 B2 | 5/2012 | Stiehl |
| 8,191,706 B1 | 6/2012 | Liu |
| 8,204,561 B2 | 6/2012 | Mongan et al. |
| 8,223,997 B2 | 7/2012 | Wilson, II et al. |
| 8,245,842 B2 | 8/2012 | Bau |
| 8,251,210 B2 | 8/2012 | Schmidt et al. |
| 8,265,264 B2 | 9/2012 | Yamaguchi et al. |
| 8,269,104 B2 | 9/2012 | Choraku et al. |
| 8,286,789 B2 | 10/2012 | Wilson et al. |
| 8,295,043 B2 | 10/2012 | Tai et al. |
| 8,311,595 B2 | 11/2012 | Takatsuka et al. |
| 8,342,325 B2 | 1/2013 | Rayner |
| 8,373,980 B2 | 2/2013 | Reber |
| 8,393,466 B2 | 3/2013 | Rayner |
| 8,430,240 B2 | 4/2013 | Kim |
| 8,454,101 B2 | 6/2013 | Kuo |
| 8,520,373 B2 | 8/2013 | Liu |
| 8,526,180 B2 | 9/2013 | Rayner |
| 8,531,824 B2 | 9/2013 | Rayner |
| 8,531,834 B2 | 9/2013 | Rayner |
| 8,548,541 B2 | 10/2013 | Rayner |
| 8,564,950 B2 | 10/2013 | Rayner |
| 8,570,737 B2 | 10/2013 | Rayner |
| 8,584,847 B2 | 11/2013 | Tages et al. |
| 8,599,547 B2 | 12/2013 | Richardson et al. |
| 8,681,103 B2 | 3/2014 | Cha et al. |
| 8,708,142 B2 | 4/2014 | Rayner |
| 8,798,675 B2 | 8/2014 | Salmon et al. |
| 8,833,379 B1 | 9/2014 | Kaplan |
| 8,995,126 B2 | 3/2015 | Rayner |

(56) References Cited

U.S. PATENT DOCUMENTS

| | | |
|---|---|---|
| 9,276,626 B2 | 3/2016 | Rayner |
| 2001/0040109 A1 | 11/2001 | Yaski et al. |
| 2002/0003584 A1 | 1/2002 | Kossin |
| 2002/0009195 A1 | 1/2002 | Schon |
| 2002/0065054 A1 | 5/2002 | Humphreys et al. |
| 2002/0071550 A1 | 6/2002 | Pletikosa |
| 2002/0079244 A1 | 6/2002 | Kwong |
| 2002/0085709 A1 | 7/2002 | Hsu |
| 2002/0090212 A1 | 7/2002 | Shimamura et al. |
| 2002/0122353 A1 | 9/2002 | Polany et al. |
| 2002/0136557 A1 | 9/2002 | Shimamura |
| 2002/0137475 A1 | 9/2002 | Shou et al. |
| 2002/0175096 A1 | 11/2002 | Linihan |
| 2002/0175901 A1 | 11/2002 | Gettemy |
| 2002/0193136 A1 | 12/2002 | Halkosaari et al. |
| 2002/0195910 A1 | 12/2002 | Hus et al. |
| 2003/0080947 A1 | 5/2003 | Genest et al. |
| 2003/0095374 A1 | 5/2003 | Richardson |
| 2003/0111366 A1 | 6/2003 | Enners |
| 2003/0118332 A1 | 6/2003 | Smith et al. |
| 2003/0118334 A1 | 6/2003 | Smith et al. |
| 2003/0128397 A1 | 7/2003 | Smith et al. |
| 2003/0223577 A1 | 12/2003 | Ono |
| 2004/0014506 A1 | 1/2004 | Kemppinen |
| 2004/0076415 A1 | 4/2004 | Silva |
| 2004/0089570 A1 | 5/2004 | Chien et al. |
| 2004/0120219 A1 | 6/2004 | Polany et al. |
| 2004/0121226 A1 | 6/2004 | Kaelin et al. |
| 2004/0188120 A1 | 9/2004 | Komatsu et al. |
| 2004/0195783 A1 | 10/2004 | Akagi et al. |
| 2004/0203502 A1 | 10/2004 | Dietrich et al. |
| 2004/0226836 A1 | 11/2004 | Schreiber et al. |
| 2005/0052425 A1 | 3/2005 | Zadesky et al. |
| 2005/0094024 A1 | 5/2005 | Sato |
| 2005/0110768 A1 | 5/2005 | Marriott et al. |
| 2005/0115852 A1 | 6/2005 | Funahashi et al. |
| 2005/0123161 A1 | 6/2005 | Polany et al. |
| 2005/0139498 A1 | 6/2005 | Goros |
| 2005/0167304 A1 | 8/2005 | Shimamura |
| 2005/0174727 A1 | 8/2005 | Thomas et al. |
| 2005/0181843 A1 | 8/2005 | Tsujimoto |
| 2005/0224508 A1 | 10/2005 | Tajiri et al. |
| 2005/0247584 A1 | 11/2005 | Lu |
| 2005/0279655 A1 | 12/2005 | Chen |
| 2005/0279661 A1 | 12/2005 | Hodges |
| 2006/0008261 A1 | 1/2006 | Watanabe et al. |
| 2006/0110146 A1 | 5/2006 | Ariga |
| 2006/0113173 A1 | 6/2006 | Matsumoto et al. |
| 2006/0255493 A1 | 11/2006 | Fouladpour |
| 2006/0274493 A1 | 12/2006 | Richardson et al. |
| 2007/0040931 A1 | 2/2007 | Nishizawa |
| 2007/0071423 A1 | 3/2007 | Fantone et al. |
| 2007/0074473 A1 | 4/2007 | Yamaguchi et al. |
| 2007/0086273 A1 | 4/2007 | Polany et al. |
| 2007/0109730 A1 | 5/2007 | Shigyo et al. |
| 2007/0110416 A1 | 5/2007 | Yamaguchi et al. |
| 2007/0115387 A1 | 5/2007 | Ho |
| 2007/0138920 A1 | 6/2007 | Austin et al. |
| 2007/0139873 A1 | 6/2007 | Thomas et al. |
| 2007/0146985 A1 | 6/2007 | Mick et al. |
| 2007/0158220 A1 | 7/2007 | Cleereman et al. |
| 2007/0171603 A1 | 7/2007 | Yang et al. |
| 2007/0184781 A1 | 8/2007 | Huskinson |
| 2007/0215663 A1 | 9/2007 | Chongson et al. |
| 2007/0241012 A1 | 10/2007 | Latchford et al. |
| 2007/0261976 A1 | 11/2007 | Anderson |
| 2007/0261978 A1 | 11/2007 | Sanderson |
| 2007/0280053 A1 | 12/2007 | Polany et al. |
| 2007/0297149 A1 | 12/2007 | Richardson et al. |
| 2008/0055258 A1 | 3/2008 | Sauers |
| 2008/0081679 A1 | 4/2008 | Kawasaki et al. |
| 2008/0157485 A1 | 7/2008 | Isono |
| 2008/0164267 A1 | 7/2008 | Huber |
| 2009/0005136 A1 | 1/2009 | Hutzel et al. |
| 2009/0009945 A1 | 1/2009 | Johnson et al. |
| 2009/0017884 A1 | 1/2009 | Rotschild |
| 2009/0028535 A1 | 1/2009 | Funahashi et al. |
| 2009/0032420 A1 | 2/2009 | Zenzai |
| 2009/0087655 A1 | 4/2009 | Yamada et al. |
| 2009/0090532 A1 | 4/2009 | Lai et al. |
| 2009/0109635 A1 | 4/2009 | Chen et al. |
| 2009/0117957 A1 | 5/2009 | Araki et al. |
| 2009/0167545 A1 | 7/2009 | Osaka |
| 2009/0211775 A1 | 8/2009 | Yamaguchi et al. |
| 2009/0215412 A1 | 8/2009 | Liu et al. |
| 2009/0260844 A1 | 10/2009 | Tseng |
| 2010/0006314 A1 | 1/2010 | Wilson, II et al. |
| 2010/0020393 A1 | 1/2010 | Mazzio |
| 2010/0044198 A1 | 2/2010 | Tang et al. |
| 2010/0053355 A1 | 3/2010 | Iwase et al. |
| 2010/0085691 A1 | 4/2010 | Yeh et al. |
| 2010/0093412 A1 | 4/2010 | Serra et al. |
| 2010/0104814 A1 | 4/2010 | Richardson et al. |
| 2010/0144194 A1 | 6/2010 | Umei et al. |
| 2010/0147737 A1 | 6/2010 | Richardson et al. |
| 2010/0181108 A1 | 7/2010 | Hata et al. |
| 2010/0200456 A1 | 8/2010 | Parkinson |
| 2010/0203931 A1 | 8/2010 | Hynecek et al. |
| 2010/0206601 A1 | 8/2010 | Choraku et al. |
| 2010/0238119 A1 | 9/2010 | Dubrovsky et al. |
| 2010/0251827 A1 | 10/2010 | Bourbeau et al. |
| 2010/0311475 A1 | 12/2010 | Takatsuka et al. |
| 2010/0313485 A1 | 12/2010 | Kuo |
| 2011/0002106 A1 | 1/2011 | Bentley et al. |
| 2011/0017620 A1 | 1/2011 | Latchford et al. |
| 2011/0024315 A1 | 2/2011 | Kim |
| 2011/0073608 A1 | 3/2011 | Richardson et al. |
| 2011/0157055 A1 | 6/2011 | Tilley et al. |
| 2011/0157800 A1 | 6/2011 | Richardson et al. |
| 2011/0228460 A1 | 9/2011 | Kim et al. |
| 2011/0300731 A1 | 12/2011 | Nakamura |
| 2012/0018325 A1 | 1/2012 | Kim |
| 2012/0019920 A1 | 1/2012 | Mongan et al. |
| 2012/0031914 A1 | 2/2012 | Liu |
| 2012/0043235 A1 | 2/2012 | Klement |
| 2012/0067711 A1 | 3/2012 | Yang |
| 2012/0099261 A1 | 4/2012 | Reber |
| 2012/0099262 A1 | 4/2012 | Reber et al. |
| 2012/0099265 A1 | 4/2012 | Reber |
| 2012/0099266 A1 | 4/2012 | Reber et al. |
| 2012/0100737 A1 | 4/2012 | Frey |
| 2012/0103844 A1 | 5/2012 | Piedra et al. |
| 2012/0118773 A1* | 5/2012 | Rayner ............... G06F 1/1626 206/320 |
| 2012/0168336 A1 | 7/2012 | Schmidt |
| 2012/0180852 A1 | 7/2012 | Cheng et al. |
| 2012/0261289 A1 | 10/2012 | Wyner et al. |
| 2012/0314354 A1 | 12/2012 | Rayner |
| 2013/0027862 A1 | 1/2013 | Rayner |
| 2013/0043777 A1 | 2/2013 | Rayner |
| 2013/0077226 A1 | 3/2013 | Rayner |
| 2013/0084728 A1 | 4/2013 | Omae et al. |
| 2013/0088130 A1 | 4/2013 | Rayner |
| 2013/0088813 A1 | 4/2013 | Su et al. |
| 2013/0088828 A1 | 4/2013 | Rayner |
| 2013/0092576 A1 | 4/2013 | Rayner |
| 2013/0098788 A1 | 4/2013 | McCarville et al. |
| 2013/0156218 A1 | 6/2013 | Annacone et al. |
| 2013/0188312 A1 | 7/2013 | Rayner |
| 2013/0220841 A1 | 8/2013 | Yang |
| 2013/0242481 A1 | 9/2013 | Kim et al. |
| 2013/0334072 A1 | 12/2013 | Rayner |
| 2014/0038443 A1 | 2/2014 | Campbell et al. |
| 2014/0065847 A1 | 3/2014 | Salmon et al. |
| 2014/0099526 A1 | 4/2014 | Powell et al. |
| 2014/0187289 A1 | 7/2014 | Cataldo et al. |
| 2014/0213088 A1 | 7/2014 | Furuya et al. |
| 2014/0228074 A1 | 8/2014 | Kulkarni et al. |
| 2014/0248787 A1 | 9/2014 | Suzuki et al. |
| 2014/0262848 A1 | 9/2014 | Fathollahi et al. |

(56) References Cited

U.S. PATENT DOCUMENTS

2014/0339012 A1 11/2014 Richardson et al.
2015/0172798 A1* 6/2015 Chao ..................... H04R 1/023
                                              381/334

FOREIGN PATENT DOCUMENTS

| | | |
|---|---|---|
| EP | 1939263 A1 | 7/2008 |
| EP | 2129202 A2 | 12/2009 |
| JP | H0561069 U | 8/1993 |
| JP | H0818637 A | 6/1994 |
| JP | 3060175 U | 7/1999 |
| JP | 3066786 U | 3/2000 |
| JP | 2000125916 A | 5/2000 |
| JP | 2000341383 A | 12/2000 |
| JP | 2001046132 A | 2/2001 |
| JP | 2001061530 A | 3/2001 |
| JP | 2002280757 A | 9/2002 |
| JP | 2003164316 A | 6/2003 |
| JP | 3458295 B2 | 10/2003 |
| JP | 2003304161 A | 10/2003 |
| JP | 2004070657 | 3/2004 |
| JP | 2005129807 A | 5/2005 |
| WO | 1994000037 A1 | 1/1994 |
| WO | 1999041958 A1 | 8/1999 |
| WO | 2000051315 A1 | 8/2000 |
| WO | 2002011161 A2 | 2/2002 |
| WO | 2012074151 A1 | 6/2012 |
| WO | 2012051358 | 12/2012 |
| WO | 2012174175 A2 | 12/2012 |
| WO | 2013096927 A1 | 6/2013 |

\* cited by examiner

FIG. 1B  FIG. 1A  FIG. 1C

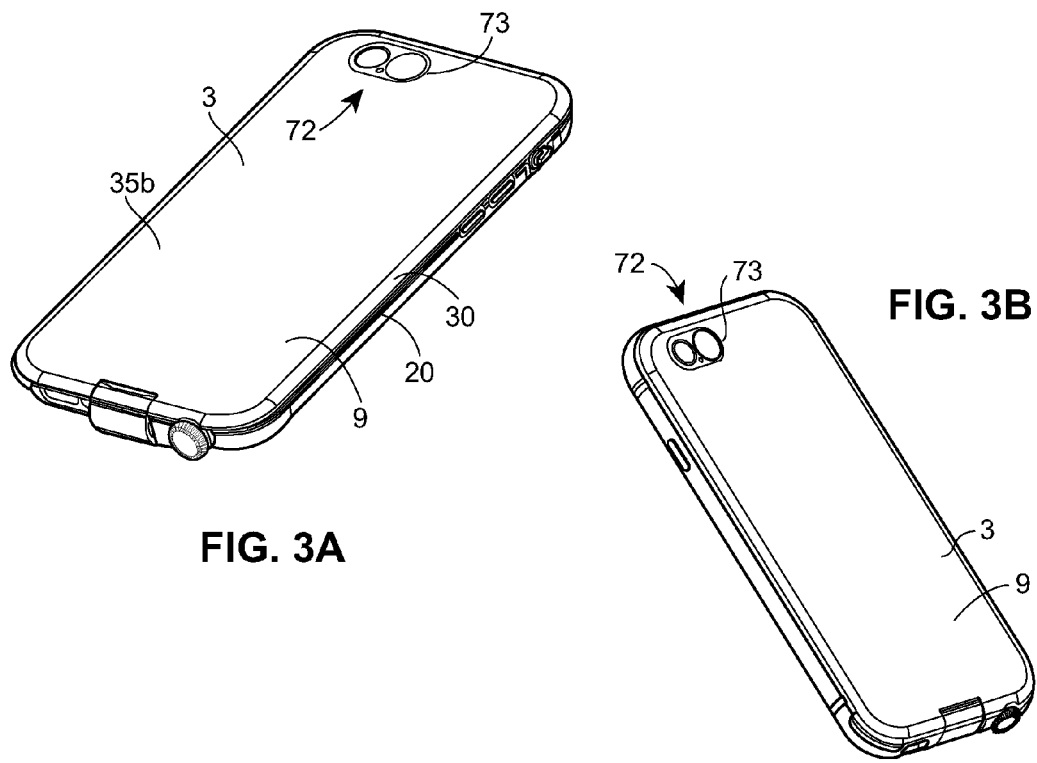
FIG. 3A
FIG. 3B
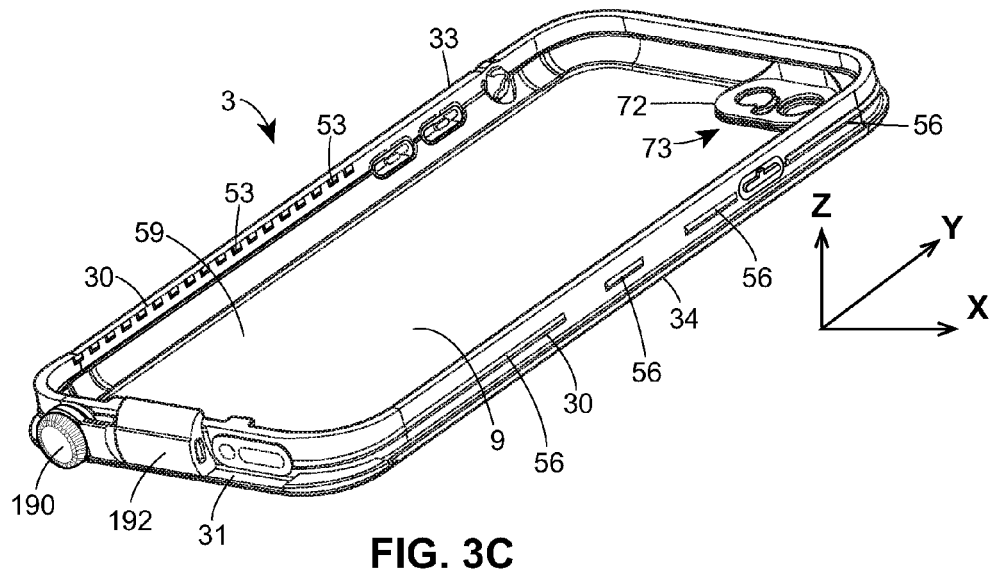
FIG. 3C

PROTECTIVE ENCLOSURE FOR ENCASING AN ELECTRONIC DEVICE

FIELD OF THE DISCLOSURE

This disclosure relates generally to a protective enclosure for protecting one or more objects, such as an object in need of protection from the elements, mishandling, and/or other mistreatment.

BACKGROUND

Rain, dirt, dust, mud, snow, and water in all of its forms can be damaging to various objects. Additionally, objects that are fragile or otherwise breakable can be damaged by mistreatment and/or other inappropriate handling, such as by dropping or impact. It is, therefore, useful to have a protective enclosure within which an object in need of protection may be housed so as to protect it from inclement conditions, mistreatment, and/or inappropriate handling. Types of objects in need of such protection are electronic devices and/or the components thereof, precious items, perishable entities, and the like.

With respect to electronic devices, such devices are well known and widely used. For instance, a mobile telephone or tablet computer are electronic devices that are convenient tools that allow people to communicate with one another while on the go and away from traditional telephone landlines or internet connections. For instance, mobile devices allow people to communicate via voice, text message, short message service (SMS), instant messaging (IM), and the like. Other such portable devices include computers, personal digital assistants, electronic digital readers, electronic game devices, video recorders, cameras, and the like. While these devices may be portable and handy to use, they suffer from some drawbacks. For example, they are often expensive and contain fragile electronic components that make them prone to damage due to inclement weather and/or mishandling.

Accordingly, there is a need in the art for a mechanism whereby an object, such as a portable device, for instance, an electronic device and/or the components thereof, may be protected from inclement weather and/or errant handling and/or other damage that may result from contacting a fluid, such as water, dirt, dust, mud, snow, and the like. The present disclosure is directed to an apparatus and system for a protective enclosure or for encasing an object, such as a device and/or the components thereof in a manner that offers protection for the device from adverse environmental conditions, inclement weather, mishandling and/or damage, such as from contacting a fluid, such as water.

BRIEF SUMMARY OF THE DISCLOSURE

In one embodiment, a protective enclosure is provided for an electronic device, the protective enclosure including a top member adapted to receive a first portion of the electronic device. The top member has a front portion and an inner perimeter wall extending from the front portion and an outer perimeter wall extending from the front portion, the inner perimeter wall extending along an inner perimeter axis from a first end to a second end. The outer perimeter wall extends along an outer perimeter axis from a first end to a second end. A space between an outer surface of the inner perimeter wall and an inner surface of the outer perimeter wall defines a channel. The protective enclosure also includes a bottom member adapted to receive a second portion of the electronic device, the bottom member having a back portion and a perimeter wall portion extending from the back portion. The perimeter wall portion has an inside surface and an outside surface, the perimeter wall portion extending along a back perimeter axis from a first end to a second end. The protective enclosure includes a first back engagement feature disposed on the inside surface of the perimeter wall portion, the first back engagement feature adapted to engage a first front engagement feature disposed on the inner perimeter wall of the top member. The protective enclosure additionally includes a second back engagement feature disposed on an outside surface of the perimeter wall portion, wherein the second back engagement feature is adapted to engage a second front engagement feature disposed on the outer perimeter wall of the top member. When the top member is coupled to the bottom member to enclose the electronic device, the first back engagement feature engages the first front engagement feature and the second back engagement feature engages the second front engagement feature to removably secure the top member to the bottom member.

In another embodiment, a protective enclosure is provided for an electronic device having a front portion that includes an interactive screen and a back portion opposite the front portion, the protective enclosure including a top member adapted to receive the front portion of the electronic device, the top member extending lengthwise about a reference longitudinal axis and widthwise about a reference transverse axis. The reference longitudinal axis and the reference transverse axis define a reference plane. The top member has a front portion and a perimeter wall portion extending from the front portion, and a window if formed in the front portion. The window is defined by a perimeter edge, the perimeter edge adapted to correspond in shape to the interactive screen of the electronic device. The perimeter edge includes a top edge extending along a top edge axis, a bottom edge extending along a bottom edge axis, a first side edge extending along a first side edge axis, and a second side edge extending along a second side edge axis. The protective enclosure additionally includes a bottom member adapted to receive the back portion of the electronic device, the bottom member having a back portion and a perimeter wall portion extending from the back portion. The bottom member is removably coupled to the top member so as to form a shell around the electronic device. The protective enclosure also includes a seal disposed along a bottom surface of the front portion adjacent to the perimeter edge defining the window, and the seal corresponds in shape to the perimeter edge. When the electronic device is disposed in the shell, the seal is disposed between the bottom surface of the front portion and the interactive screen of the electronic device so as to form a fluid-tight seal between the bottom surface of the front portion and the interactive screen of the electronic device. The seal includes a top segment adjacent to the top edge of the perimeter edge, a bottom segment adjacent to the bottom edge of the perimeter edge, a first side segment adjacent to the first side edge of the perimeter edge, and a second side segment adjacent to the second side edge of the perimeter edge. The top segment includes a first end portion, a second end portion, and a main portion between the first end portion and the second end portion, wherein the main portion of the top segment has an arcuate shape when viewed along the reference plane such that at least a midpoint of the top segment is adapted to be biased into contact with a portion of the interactive screen of the electronic device. The bottom segment includes a first end portion, a second end portion, and a main portion between the first end portion and the second end portion, wherein the main portion of the top segment has an arcuate shape when viewed along the reference plane such that at least a midpoint of the bottom segment is adapted to be biased into contact with a portion of the interactive screen of the electronic device.

In a further embodiment, a protective enclosure is provided for an electronic device having a front portion that includes an interactive screen and a back portion opposite the front portion, the protective enclosure including a top member adapted to receive the front portion of the electronic device. The top member has a front portion and a perimeter wall extending from the front portion, and a window is formed in the front portion. The window is defined by a perimeter edge, and the perimeter edge is adapted to correspond in shape to the interactive screen of the electronic device. The protective enclosure also includes a bottom member adapted to receive the back portion of the electronic device, the bottom member having a back portion and a perimeter wall portion extending from the back portion. The bottom member is removably coupled to the front portion so as to form a shell around the electronic device. A lens insert member assembly is disposed in an aperture in the bottom member, the lens insert member assembly including a lens insert body defined by a perimeter surface that corresponds in shape to the aperture in the bottom member, the lens insert member body having an outside surface and an inside surface. The lens insert body includes a flash aperture that extends along a flash aperture axis from a first end at or adjacent to the inside surface to a second end at or adjacent to the outside surface, the flash aperture adapted to be aligned with a flash of the electronic device when the electronic device is disposed within the shell. The flash aperture is defined by a circumferential wall that extends from the first end of the flash aperture to the second end of the flash aperture, and a diameter of the circumferential wall of the flash aperture at the first end is greater than a diameter of the flash of the electronic device. A diameter of the circumferential wall of the flash aperture at the second end is greater than the diameter of the circumferential wall of the flash aperture at the first end. The lens insert body also includes a camera aperture that extends along a camera aperture axis from a first end at or adjacent to the inside surface to a second end at or adjacent to the outside surface, the camera aperture adapted to be aligned with a camera of the electronic device when the electronic device is disposed within the shell. The camera aperture is defined by a circumferential wall, and a diameter of the circumferential wall of the camera aperture at the first end is greater than a diameter of the camera of the electronic device. The lens insert member assembly also includes an optically-clear camera lens disposed within the camera aperture.

In a still further embodiment, a protective enclosure is provided for an electronic device having a front portion that includes an interactive screen and a back portion opposite the front portion, the protective enclosure including a top member adapted to receive the front portion of the electronic device. The top member has a front portion and a perimeter wall portion extending from the front portion, and a window is formed in the front portion. The window is defined by a perimeter edge, the perimeter edge adapted to correspond in shape to the interactive screen of the electronic device, and the perimeter edge defining a reference plane. The protective enclosure also includes a bottom member adapted to receive the back portion of the electronic device, the bottom member having a back portion and a perimeter wall portion extending from the back portion. The bottom member is removably coupled to the front portion so as to form a shell that is adapted to encase the electronic device such that the electronic device is disposed within an interior volume within the shell. A first sound path is formed in an end portion of one or both of the bottom member or the top member, the first sound path having a first end portion that is open to the interior volume within the shell and a second end portion that is open to an exterior of the shell. The first end portion of the first sound path is adapted to be aligned with a portion of a first audio feature of the electronic device when the electronic device is disposed within the shell, and the second end portion of the sound path being on or adjacent to the front portion of the top member. The first sound path includes a first segment that extends along a first segment axis from the first end portion to a first intermediate point and a second segment that extends along a second segment axis from a second intermediate point to the second end portion. The first segment axis in not parallel to or collinearly aligned with the second segment axis.

In one more embodiment, a protective enclosure is provided for an electronic device having a camera and a flash, the electronic device having a front portion that includes an interactive screen and a back portion opposite the front portion. The protective enclosure includes a top member adapted to receive the front portion of the electronic device and a bottom member adapted to receive the back portion of the electronic device. The top member is releasably secured to the bottom member, the bottom member having a back portion. A flash overlay is disposed at least partially on the back member, the flash overlay comprising an optically-clear material and adapted to overlay at least a portion of the flash of the electronic device when the electronic device is disposed between the top member and the bottom member. The flash overlay extends along a main axis from a first end to a second end opposite the first end. A first portion of the flash overlay extends between the first end of the flash overlay and an intermediate point of the flash overlay and a second portion of the flash overlay extends between the intermediate point of the flash overlay and the second end of the flash overlay. The first portion of the flash overlay has a shape that is different than a shape of the second portion of the flash overlay, and a cross-sectional shape of the first portion and a cross-sectional shape of the second portion cooperate to achieve uniform target illumination when the flash of the camera when the electronic device is disposed between the top member and the bottom member.

In one embodiment, a protective enclosure is provided for an electronic device having a first audio feature and a second audio feature, the electronic device having a front portion that includes an interactive screen and a back portion opposite the front portion, and the protective enclosure includes a top member adapted to receive the front portion of the electronic device. The protective enclosure also includes a bottom member adapted to receive the back portion of the electronic device, the top member being releasably secured to the bottom member so as to form a shell that is adapted to encase the electronic device such that the electronic device is disposed within an interior volume within the shell. The protective enclosure further includes a seal assembly disposed in an aperture formed in at least one of the top member and the bottom member, and the seal assembly includes a seal body that extends along a seal axis from a first end to a second end. The first end of the seal body is adapted to be in engagement with a first portion and a second portion of the electronic device when the electronic device is disposed within the shell such that the electronic device compresses the seal body along the seal axis, the first portion of the of the electronic device surrounding the first audio feature and the second portion of the electronic device surrounding the second audio feature. The seal body defines a first seal aperture extending from the first end of the seal body to the second end of the seal body along the seal axis, the first seal aperture at the first end of the seal body being adapted to surround the first audio feature of the electronic device such that the first end of the seal body is in sealing engagement with the first portion of the electronic device surrounding the first audio feature. The seal body defines a second seal aperture extending from the first end of the seal body to the second end of the seal body along the seal axis. The second seal aperture at the first end of the seal body is adapted to surround the second audio feature of the electronic device such that the first end of the seal body is in sealing engagement with the second portion of the electronic device surrounding the second audio feature. The seal assembly includes a first membrane extending across the first seal aperture, and a portion of the first seal aperture between the first end of the seal body and the first membrane defines a first seal body volume. A second membrane extends across the second seal aperture and a portion of the second seal aperture between the first end and the second membrane defines a second seal body volume. A first leak channel extends through the seal body, the first leak channel having a first end open to the second seal body volume and a second end open to the first seal body volume. The first leak channel is sized and configured to allow pressure to be relieved in the second seal body volume without allowing sound from the first seal body volume to travel through the first leak channel and into the second seal body volume.

In another embodiment, a protective enclosure is provided for an electronic device having a first audio feature, the electronic device having a front portion that includes an interactive screen and a back portion opposite the front portion, the protective enclosure including a top member adapted to receive the front portion of the electronic device. The protective enclosure also includes a bottom member adapted to receive the back portion of the electronic device, the top member being releasably secured to the bottom member so as to form a shell that is adapted to encase the electronic device such that the electronic device is disposed within an interior volume within the shell. The protective enclosure additionally includes a seal assembly disposed in an aperture formed in at least one of the top member and the bottom member, the seal assembly including a seal body that extends along a seal axis from a first end to a second end. The first end of the seal body is adapted to be in engagement with a first portion of the electronic device when the electronic device is disposed within the shell such that the electronic device compresses the seal body along the seal axis. The first portion of the electronic device surrounds the first audio feature. The seal body defines a first seal aperture extending from the first end of the seal body to the second end of the seal body along the seal axis, the first seal aperture at the first end of the seal body being adapted to surround the first audio feature of the electronic device such that the first end of the seal body is in sealing engagement with the first portion of the electronic device surrounding the first audio feature. A first membrane extends across the first seal aperture, and a portion of the first seal aperture between the first end of the seal body and the first membrane defines a first seal body volume. A first leak channel extends through the seal body, the first leak channel having a first end open to the interior volume within the shell and a second end open to the first seal body volume. The first leak channel is sized and configured to allow pressure to be relieved in the first seal body volume without allowing sound from the interior volume to travel through the first leak channel and into the first seal body volume.

BRIEF DESCRIPTION OF THE DRAWINGS

FIGS. 1A to 1E are various views of an embodiment of a protective enclosure;

FIGS. 3A to 3D are various isometric views of an embodiment of a bottom member of the embodiment of the protective enclosure of FIG. 1A;

DETAILED DESCRIPTION

Figure 1D:
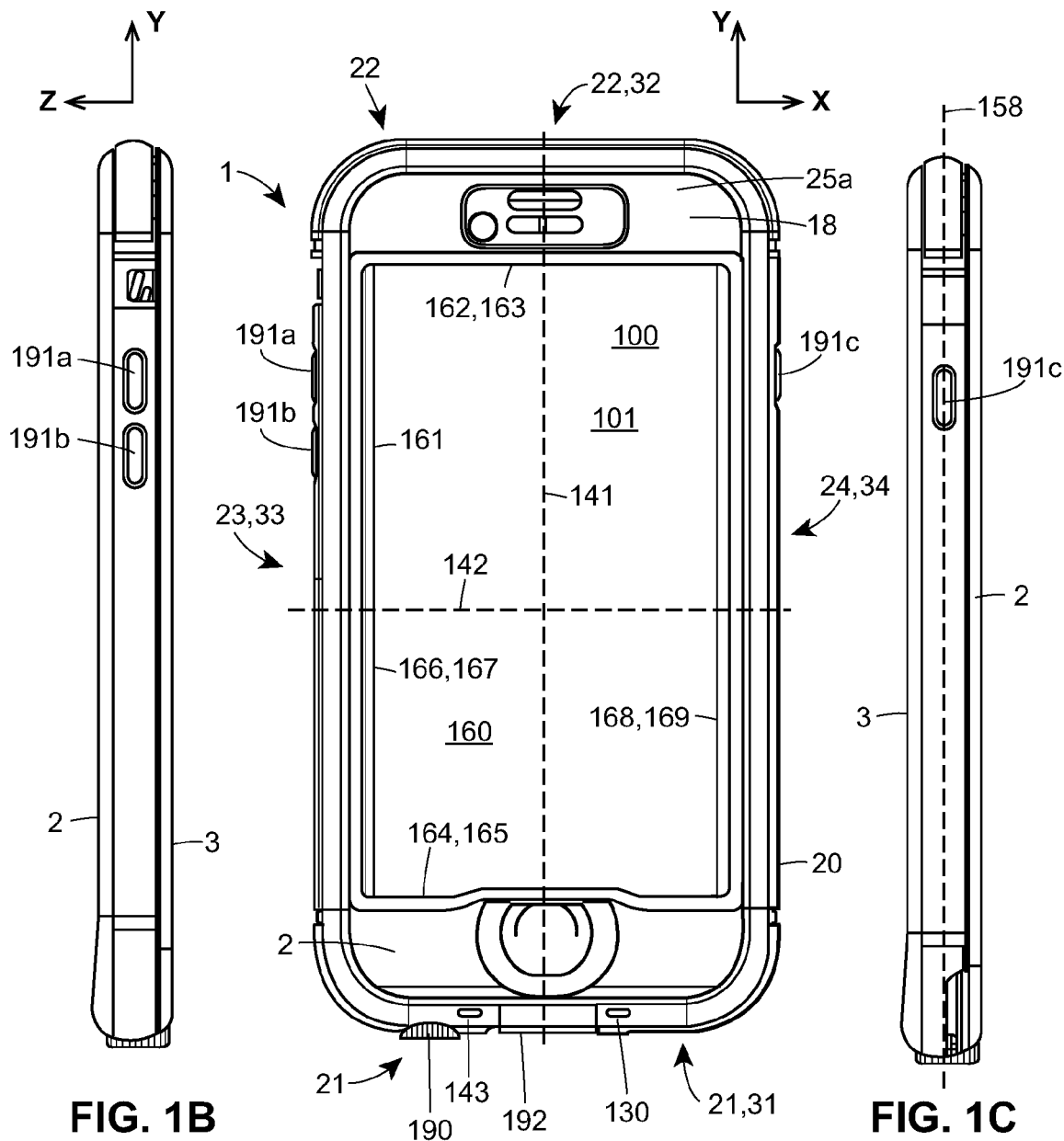
Figure 1D:
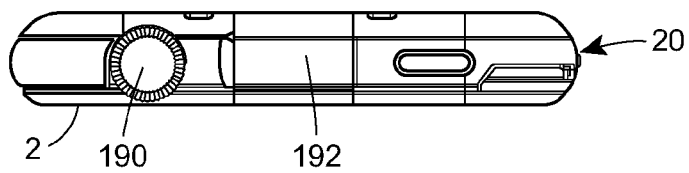

The subject matter described herein relates generally to a housing, or protective enclosure, for encasing an object. It is to be understood that although the singular "object" is used herein, the term encompasses one or more objects. The object or objects may be any object that is capable of being fit within the protective enclosure and/or in need of protecting from one or more adverse environmental conditions, inclement weather, mishandling and/or damage, such as damage from contacting a liquid, such as water, or damage from dropping. The protective enclosure may be of any appropriate size and dimension so long as it is capable of enclosing the object and protecting it, for instance, from adverse environmental conditions and/or rough treatment. The object may be fabricated, e.g., a textile; manufactured; e.g., an electronic or mechanical device; synthesized; naturally occurring; processed; perishable, e.g., a food product; a precious item; and the like. The object may be a single object, like an electronic device, or may be a plurality of objects, such as components that make up an electronic device.

The protective enclosure may be in the form of any typical container known and used in the art for containing the particular object. For example, the protective enclosure may be a case configured for encasing a device, such as an electronic device, that may be, for example, a mobile telephone device, a mobile computing device, and/or a smart phone. The electronic device may have an interactive screen, such as a touch screen. In other instances, the protective enclosure is part of a device, such as an electronic device, which encloses or encases various components of the electronic device. For example, the protective enclosure may be the protective enclosure or housing of a mobile device, or other electronic device, that encases the electronic components of the mobile telephone device (or other electronic device).

In certain embodiments the top member and the bottom ember of the protective enclosure are configured for being coupled together so as to from a waterproof seal and/or shockproof structure. By a water-resistant or waterproof seal, it is meant that a seal is formed by the coupling of the top member with the bottom member in which the seal does not substantially allow the passage of liquid, e.g., water, from one side of the protective enclosure (e.g., outside of or exterior to the protective enclosure) to the other side of the protective enclosure (e.g., inside of or in an interior of the protective enclosure). By a shock resistant or shockproof structure, it is meant that one or more members of the protective enclosure functions to reduce the amount of or change the characteristics of a mechanical load imparted on the protective case so as to reduce the probability of damage to the particular object.

As can be seen with respect to FIG. 1A, the protective enclosure may include a plurality of members, such as a top member and a bottom member, that are configured for being removably coupled together so as to form the protective enclosure 1. That is, the bottom member may be removably coupled to the top member so as to form a shell around the electronic device.

It is to be understood that although a particular embodiment is presented herein, such as a protective enclosure 1 for encasing the electronic device, such as a mobile phone, therein, the object to be housed may be any of a number of different objects, as described above, and the protective enclosure may, therefore, have a number of different shapes, sizes, and configurations without departing from the nature of the disclosure. For instance, as herein depicted below, the protective enclosure may include two separate members, e.g., separate individual top and bottom members, that are configured for being removably coupled together so as to surround an electronic device and thereby encase the electronic device. In certain instances (not shown), the top and bottom members may not be separate members, but rather may be members that are joined, for instance, by a common hinge element, or a single member configured for being folded upon itself and thereby forming the protective enclosure. Hence, the scope of the protective enclosures and systems described herein with respect to the particular embodiments set forth in reference to the figures is not intended to be unduly limiting. While the terms "enclosure," "encloses," "surround," and the like are used herein, the disclosed improvements may also be utilized in or with apparatuses which do not fully enclose the object with which the enclosure or apparatus is being used.

Accordingly, FIG. 1A illustrates a front view of a protective enclosure 1 that may include a top member 2 and a bottom member 3 that when removably coupled together form at least a portion of the protective enclosure 1 to receive an electronic device 100. The top member 2 maybe adapted to receive a front portion of the electronic device 100 and the bottom member 3 may be adapted to receive a back portion of the electronic device 100 when the bottom member 3 is removably coupled to the top member 2 so as to form a shell around the electronic device 100. In some embodiments the top member 2 maybe adapted to receive the bottom portion of the electronic device 100 and the bottom member 3 may be adapted to receive the front portion of the electronic device 100 when the bottom member 3 is removably coupled to the top member 2 so as to form a shell around the electronic device 100.

Figure 1E:
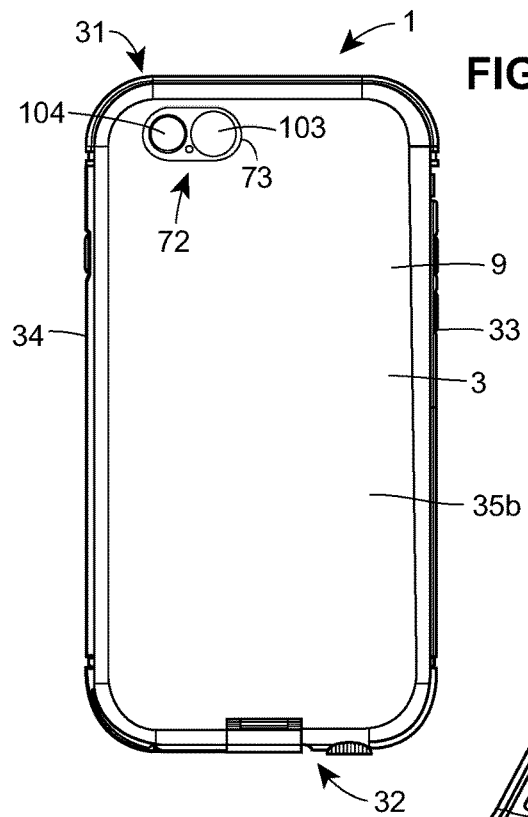
Figure 1F:
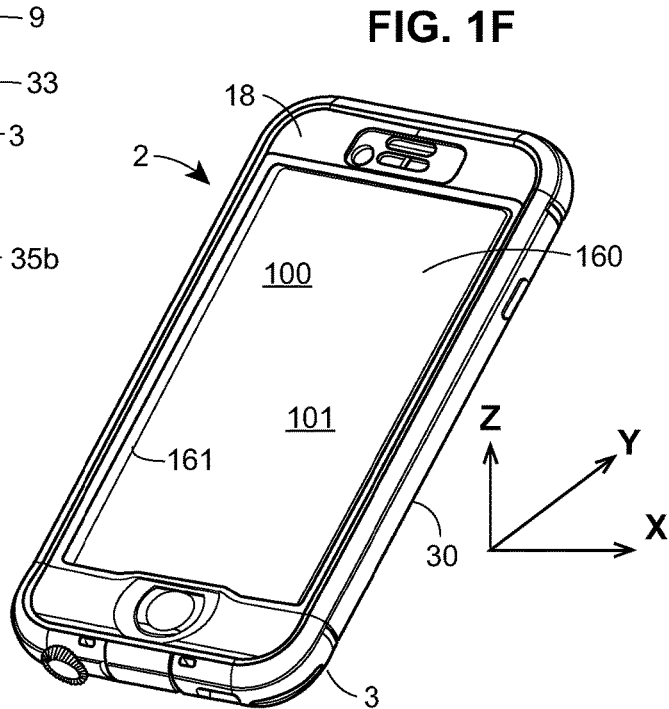
FIGS. 1F to 1H are various isometric views of the embodiment of the protective enclosure of FIG. 1A.
Figure 1G:
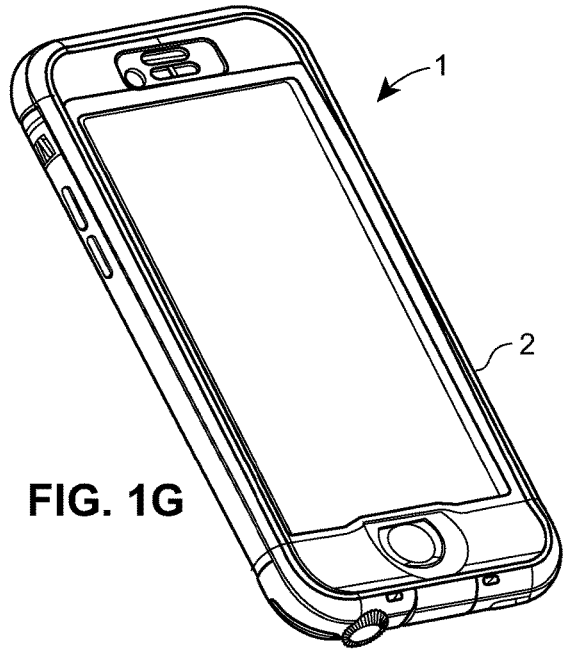
Figure 1H:
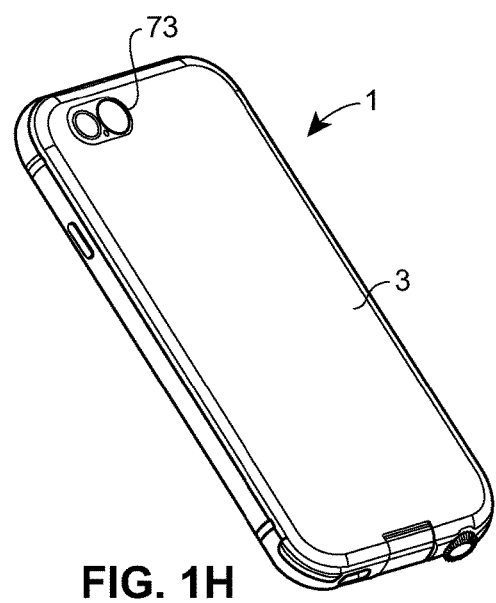

FIGS. 1B and 1C illustrate a left side view and a right side view, respectively, of the protective enclosure 1 of FIG. 1A and FIG. 1D illustrates a bottom side view of the protective enclosure 1 of FIG. 1A. FIG. 1E illustrates a bottom side view of the protective enclosure 1 of FIG. 1A. FIGS. 1F and 1G illustrate front perspective views of the protective enclosure 1 of FIG. 1A, and FIG. 1H illustrates a rear perspective view of the protective enclosure 1 of FIG. 1A.

The top member 2 and the bottom member 3 may be fabricated from any suitable material but typically are fabricated from materials that are capable of providing one or more of shock and liquid resistance to an encased device when the top and bottom members are properly coupled together. In certain embodiments, the top member 2 and bottom member 3 may be composed of various different components and therefore may be fabricated from a plurality of different materials. Suitable materials from which the top member 2 and the bottom member 3 may be fabricated include rigid, semi-rigid, and flexible materials that may be fabricated together so as to provide shock and/or liquid resistance to the protective enclosure. Such materials may include (but are not hereby limited to) plastics, metals, polycarbonates, nylon, liquid crystal polymers, rubber, thermal plastic urethanes, polyethylenes, polypropylenes, mixtures thereof and the like.

Figure 2A:
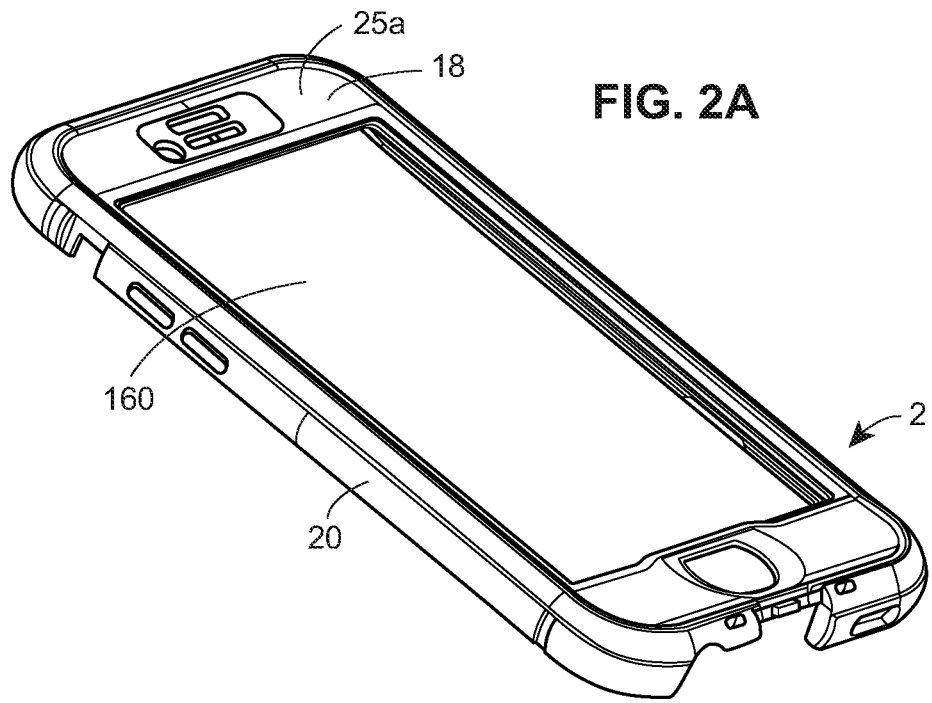
FIGS. 2A to 2D are various isometric views of an embodiment of a top member of the embodiment of the protective enclosure of FIG. 1A.
Figure 2B:
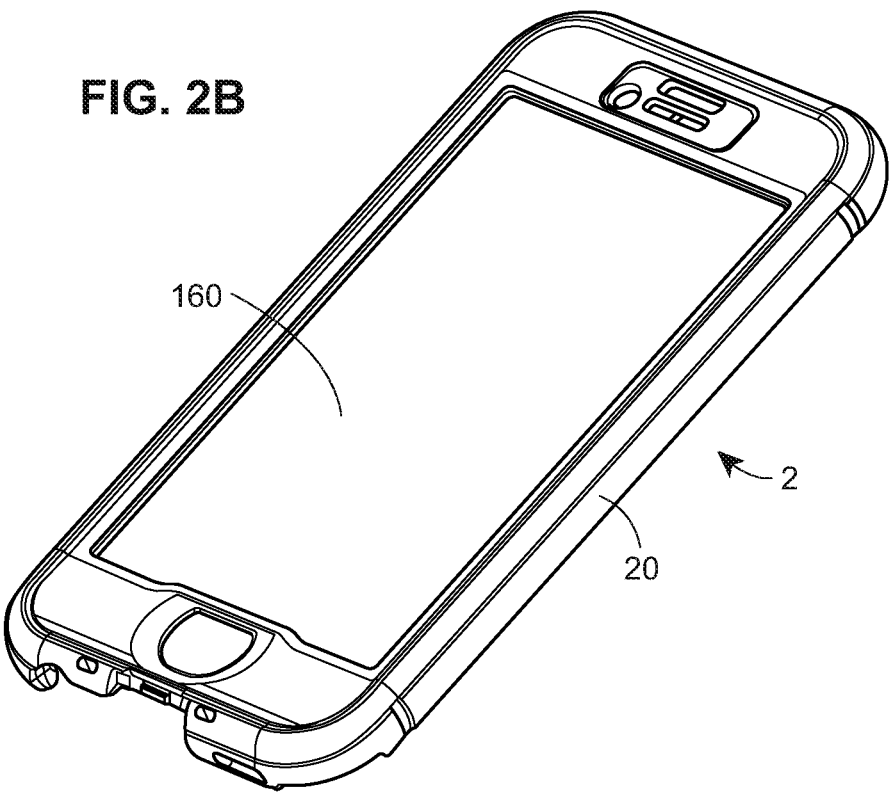
Figure 2C:
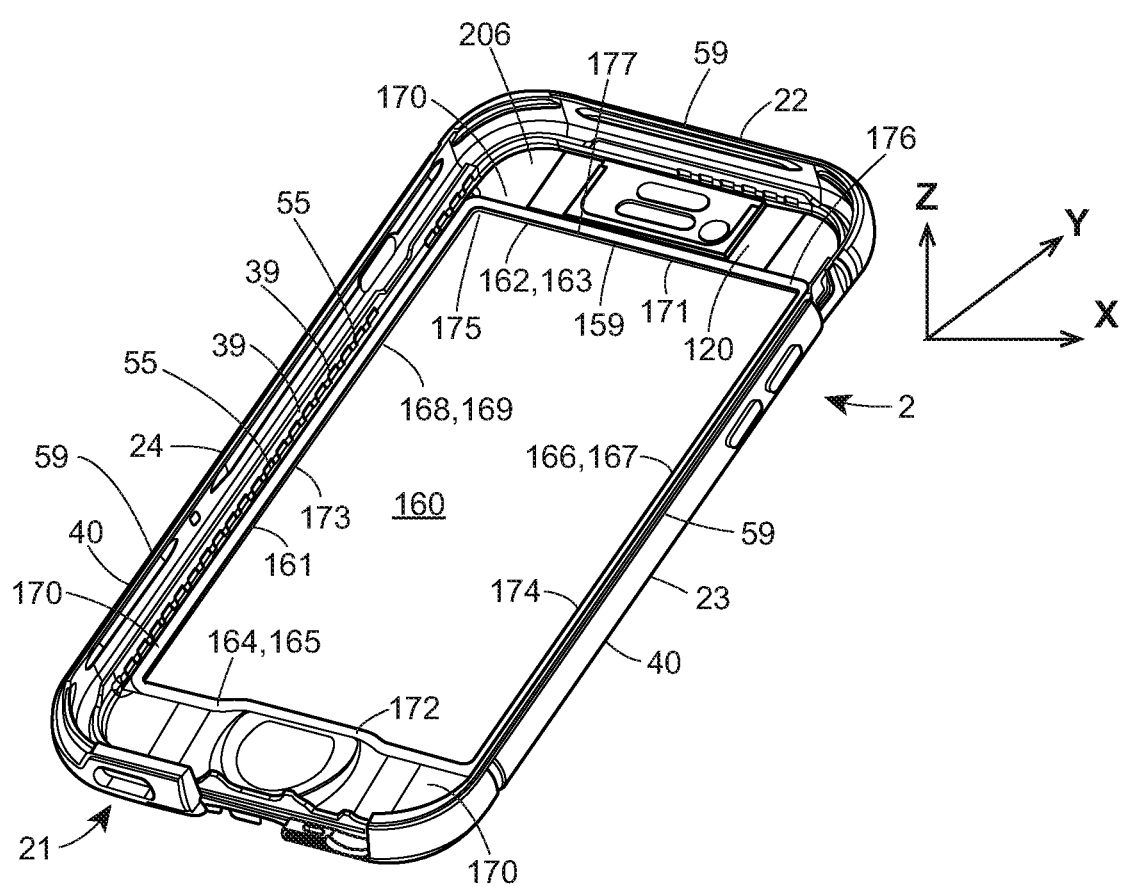
Figure 2D:
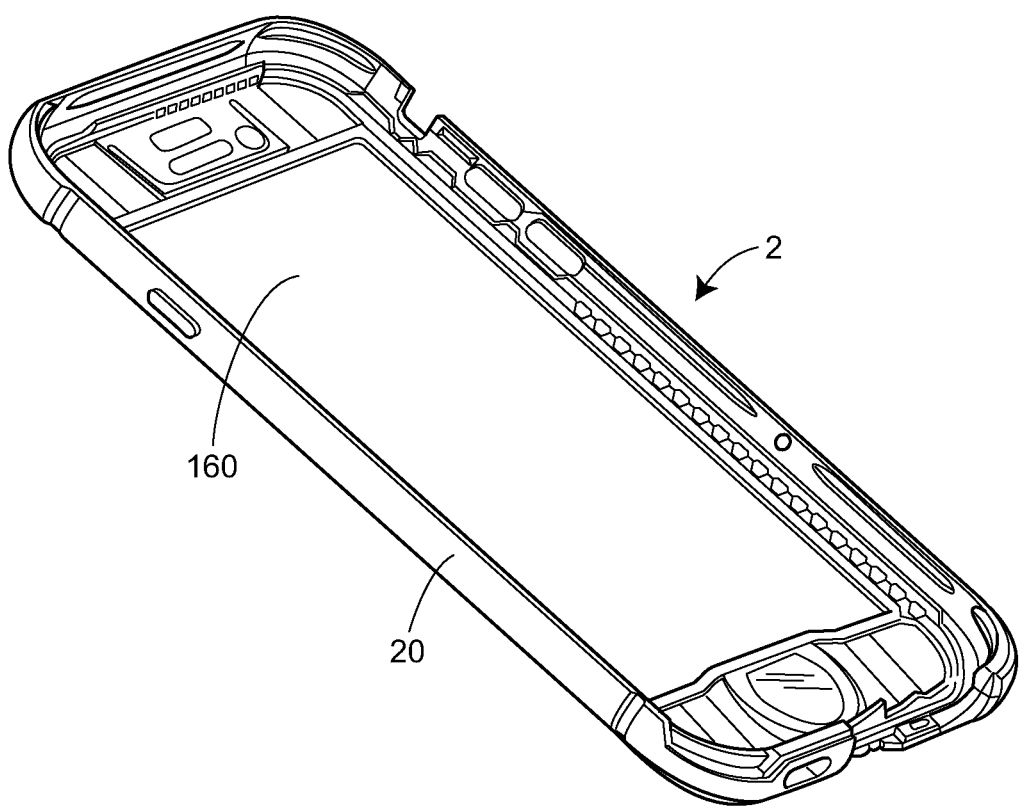

The top member 2 of the embodiment of the protective enclosure of FIG. 1A is illustrated in the front perspective views of FIGS. 2A and 2B, while FIGS. 2C and 2D illustrate rear perspective views of the embodiment of the protective enclosure of FIG. 1A. As can be seen with respect to FIG. 2A, the top member 2 of the protective enclosure 1 includes a front portion 18 having a front surface 25a and a back surface 25b (illustrated in FIG. 2C) opposite the front surface 25a, and the front portion 18 may be surrounded by a perimeter wall portion 20. As illustrated in FIG. 1B, the perimeter wall portion 20 may extend from (e.g., away from) the front portion 18 in a direction that is normal to or generally normal to the front portion 18. That is, if the front portion 18 extends or generally extends in, along, or parallel to the X-Y plane of the reference coordinate system illustrated in FIG. 1A, then the perimeter wall portion 20 may extend along or generally along the Z-axis of the reference coordinate system illustrated in FIGS. 1B and 2C. Referring to FIG. 2C, the perimeter wall portion 20 may be defined by a proximal end portion 21 and a distal end portion 22 as well as a first side portion 23 and a second side portion 24. The proximal end portion 21, the distal end portion 22, the first side portion 23, and the second side portion 24 may cooperate to have the same or similar shape and inner dimensions as an outer perimeter edge of the electronic device 100 so that the front portion of the electronic device 100 fits snugly or tightly within the perimeter wall portion 20 of the top member 2.

As illustrated in FIG. 1A, a window 160 may be formed in the front portion 18 of the top member 2 (e.g., as an opening in the front portion 18), and the window 160 may be defined by a perimeter edge 161. In other embodiments (not shown), the window 160 may alternatively be formed on the back portion 9 of the bottom member 3. The perimeter edge 161 may be adapted to correspond in shape to the interactive screen of the electronic device 100 (or a portion of the interactive screen of the electronic device 100) such that a user can access or contact the interactive screen 101 of the electronic device 100 when the electronic device 100 is disposed in the shell formed by the top member 2 and the bottom member 3. The window 160 will be discussed in more detail below.

The perimeter wall portion 20 may include a plurality of additional features. For example, as illustrated in FIGS. 1A, 1B, and 1C the perimeter wall portion 20 may include one or more button protection elements 191a, 191b, 191c that may be coupled to or disposed on the perimeter wall portion 20 to allow for the depressing or activation of corresponding buttons on the of the electronic device 100. The one or more button protection elements 191a, 191b, 191c may operate in conjunction with other portions of the protective enclosure (e.g., portions of the bottom ember 3) to allow for the depressing or activation of corresponding buttons of the electronic device 100. Any number of button protection elements 191a, 191b 191c may be coupled to or disposed on the perimeter wall portion 20 (and/or any other portion of the protective enclosure 1). The front portion 18 of the top member 2 may be composed of a single material or different materials, and the material(s) may be the same or different from the materials) of the perimeter wall portion 20.

Figure 3D:
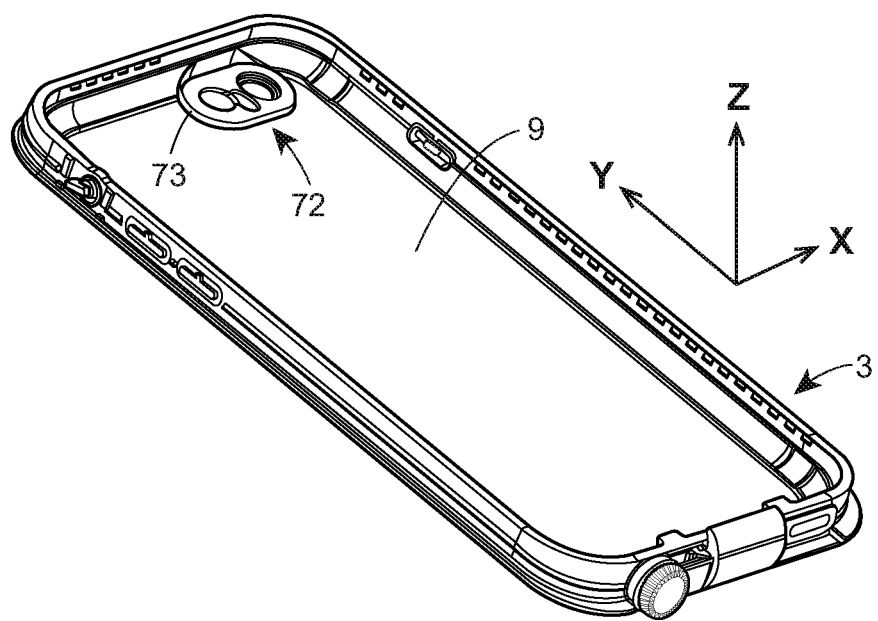

As previously mentioned, the protective enclosure 1 may also include the bottom member 3 adapted to be removably coupled to the top member 2. The bottom member 3 of the embodiment of the protective enclosure of FIG. 1A is illustrated in the front perspective views of FIGS. 3A and 3B, while FIGS. 3C and 3D illustrate rear perspective views of the embodiment of the protective enclosure of FIG. 1A.

As illustrated in FIG. 3C, the bottom member 3 of the protective enclosure 1 may include a back portion 9 that may include a front surface 35a and a back surface 35b (see FIG. 3A). The back portion 9 may be surrounded by a perimeter wall portion 30, and the perimeter wall portion 30 may extend from (e.g., away from) the back portion 9 in a direction that is normal to or generally normal to the back portion 9 (e.g. along the Z-axis of the reference coordinate system of FIG. 3C). The perimeter wall portion 30 may be defined by a proximal end portion 31 and a distal end portion 32 as well as a first side portion 33 and a second side portion 34. The proximal end portion 31, the distal end portion 32, the first side portion 33, and the second side portion 34 may cooperate to have the same or similar shape and inner dimensions as an outer perimeter edge of the electronic device 100 so that the back portion of the electronic device 100 fits snugly or tightly within the perimeter wall portion 30 of the bottom member 3. The perimeter wall portion 30 of the bottom member 3 may include a headphone port sealing member 190 removably coupled to the perimeter wall portion 20 and a latch door 192 pivotably coupled to the perimeter wall portion 30 to allow access to interface features of the electronic device 100. However, in some embodiments, the headphone port sealing member 190 and/or the latch door 192 may be coupled to or located at any other suitable position on the protective enclosure 1. The back portion 9 of the bottom member 3 may be composed of a single material or different materials, and the material(s) may be the same or different from the material(s) of the perimeter wall portion 30. In certain embodiments, the back portion 9 of the protective enclosure 1 is formed of a semi-rigid material and a portion of the back portion 9 may be made of or comprise a transparent or translucent material.

FIGS. 1A to 1H illustrate the top member 2 and the bottom member 3 of the protective enclosure 1 fitted around an electronic device 100 enclosed therein. To couple the top member 2 and the bottom member 3, the top member 2 and the bottom member 3 are aligned with respect to the electronic device 100 to be enclosed within the protective enclosure 1, prior to the top member 2 and the bottom member 3 being fitted around the device and secured together.

Referring to FIG. 2C, a seal 159 (also known as a gasket) may be disposed between the front portion 18 of the top member 2 and a surface of the interactive screen 101 of the electronic device 100, and the seal 159 may have the general shape of the perimeter edge 161 of the window 160. So disposed, and as will be described in more detail below, the seal 159 may prevent liquid from passing or leaking between the front portion 18 of the top member 2 and a surface 102 of the interactive screen 101 of the electronic device 100.

Figure 4A:
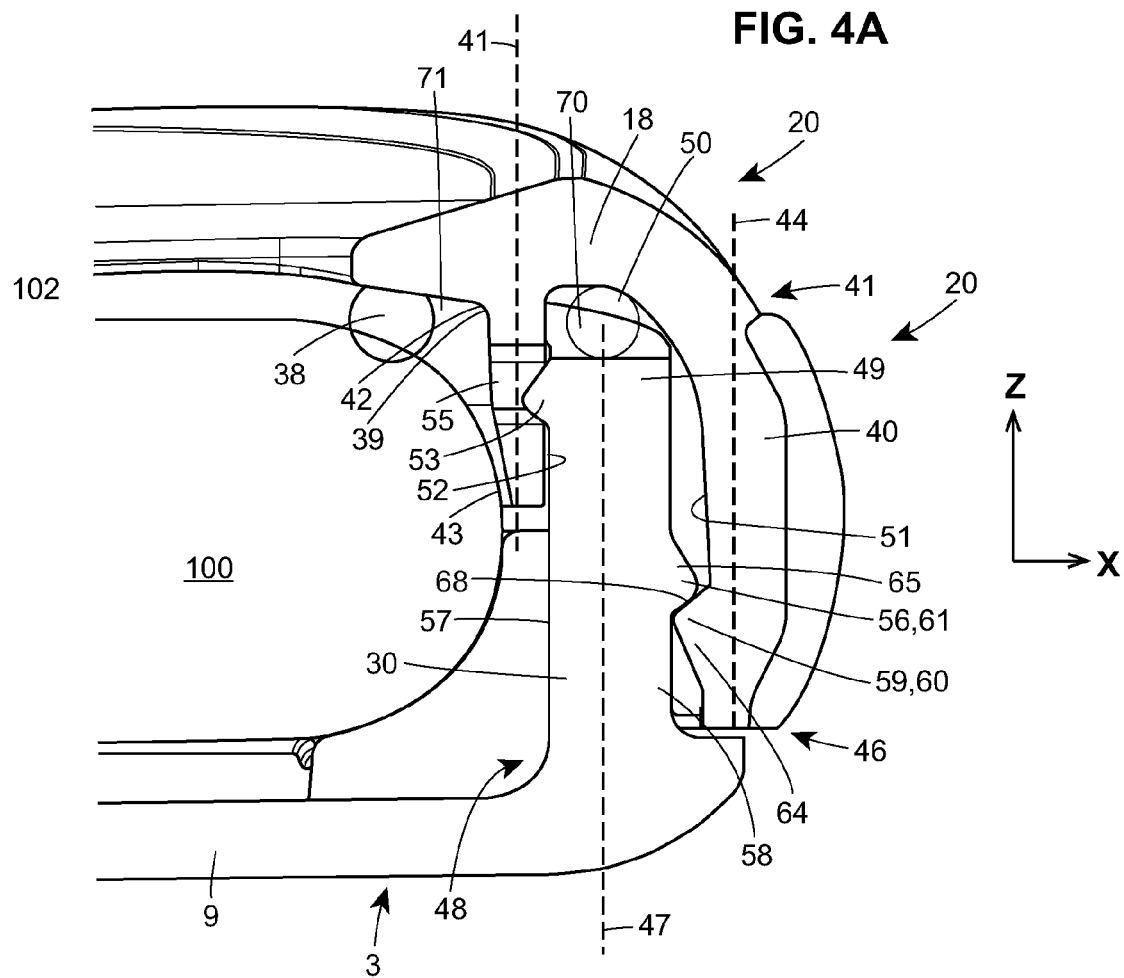
FIG. 4A is a partial cross-sectional view of an embodiment of the protective enclosure of FIG. 1A.

The top member 2 and the bottom member 3 may be removably coupled in any suitable manner. For example, as illustrated in FIG. 4A, the bottom member 3 may include one or more first back engagement features 53, with each disposed on a portion of the perimeter wall portion 30 and each adapted to engage a corresponding first front engagement feature 55 disposed on a portion of the perimeter wall portion 20 of the top member 2. In addition (or alternatively), the bottom member 3 may include one or more second back engagement features 56, with each disposed on a portion of the perimeter wall portion 30 and each adapted to engage a corresponding second front engagement feature 59 disposed on a portion of the perimeter wall portion 20 of the top member 2.

More particularly, and still referring to FIG. 4A, all or a portion of the perimeter wall portion 20 of the top member 2 may include an inner perimeter wall 39 extending from the front portion 18 and an outer perimeter wall 40 extending from the front portion 18. The inner perimeter wall 39 may extend along an inner perimeter axis 41 from a first end 42 to a second end 43, and the first end 42 may be at or adjacent to the front portion 18. The outer perimeter wall 40 may extend along an outer perimeter axis 44 from a first end 45 to a second end 46, and the first end 45 may be at or adjacent to the front portion 18. A space (e.g., an offset along the X-axis of the reference coordinate system of FIG. 4A) between an outer surface 52 of the inner perimeter wall 39 and an inner surface 51 of the outer perimeter wall 40 defines a channel 50. The inner perimeter axis 41 and/or the outer perimeter axis 44 may be parallel to or generally parallel to the Z-axis of the reference coordinate system of FIG. 4A.

In some embodiments, such as that illustrated in FIG. 2C, all or a portion of the first side portion 23 and/or the second side portion 24 of the perimeter wall portion 20 of the top member 2 may include the inner perimeter wall 39 and the outer perimeter wall 40. In addition, or alternatively, all or a portion of the proximal end portion 21 and/or the distal end portion 22 of the perimeter wall portion 20 of the top member 2 may include the inner perimeter wall 39 and the outer perimeter wall 40.

Referring to FIG. 3C, the perimeter wall portion 30 of the bottom member 3 may extend along the entire perimeter of the back portion 9 or along one or more portions of the perimeter of the back portion 9. With reference to FIG. 4A, the perimeter wall portion 30 may extend along a back perimeter axis 47 from a first end 48 to a second end 49, and the first end 48 may be at or adjacent to the back portion 9. The back perimeter axis 47 may be parallel to or generally parallel to the Z-axis of the reference coordinate system of FIG. 4A. When the bottom member 3 is coupled to the front member 2 to form the shell to encase the electronic device 100, the second end 49 of the perimeter wall portion 30 may be disposed within the channel 50. In some embodiments, the back perimeter axis 47 may be parallel (or substantially parallel) to the outer perimeter axis 44 and/or the inner perimeter axis 41.

Figure 5A:
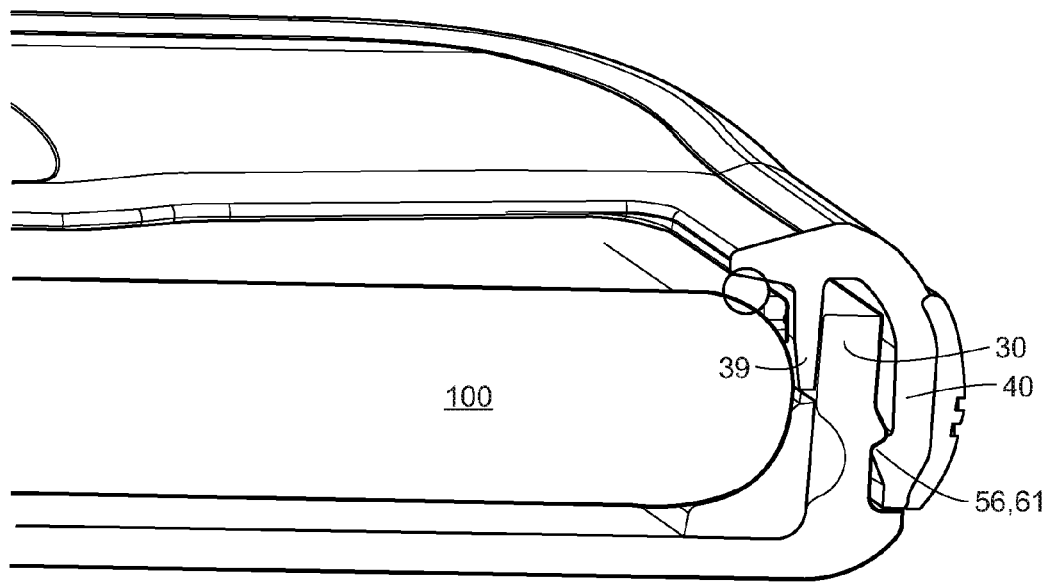
FIG. 5A is a partial cross-sectional view along a first plane of an embodiment of the protective enclosure of FIG. 1A.
Figure 5B:
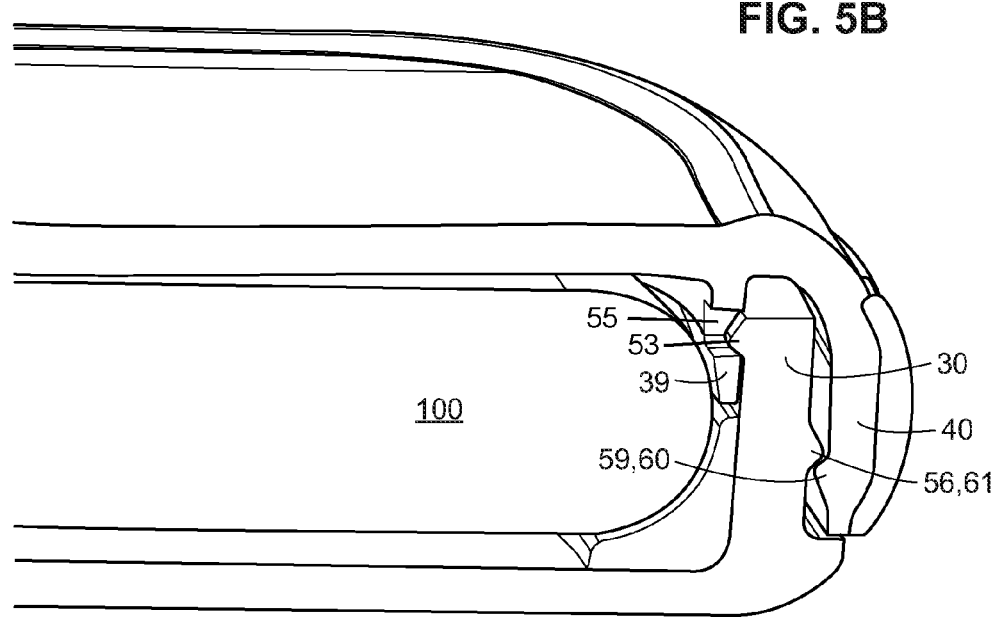
FIG. 5B is a partial cross-sectional view along a second plane that is offset from the first plane of FIG. 5A.

The bottom member 3 may include the first back engagement feature 53 disposed on an inside surface 57 of the perimeter wall portion 30, as illustrated in FIG. 4A. The first back engagement feature 53 may engage (or be adapted to engage) a first front engagement feature 55 disposed on the inner perimeter wall 39 of the top member 2. The first back engagement feature 53 may be disposed at any suitable location, and may be disposed at or adjacent to the second end 49 of the perimeter wall portion 30. In some embodiments, as illustrated in FIG. 2C, a plurality of first front engagement features 55 may be disposed on the inner perimeter wall 39 of the top member 2 along the first side portion 23 and the second side portion 24 of the perimeter wall portion 20. In addition, as illustrated in FIG. 3C, a plurality of first back engagement features 53 may be disposed on the inside surface 57 of the perimeter wall portion 30. FIG. 5A shows a cross-sectional view (taken along the X-Z plane of the reference coordinate system of FIG. 4A) of the protective enclosure 1 taken in a gap between adjacent first back engagement features 53 and between adjacent first front engagement features 55, while FIG. 5B shows a cross-sectional view (taken along the X-Z plane of the reference coordinate system of FIG. 4A) of the protective enclosure 1 of FIG. 5A that intersects one of the plurality of first back engagement features 53 and first front engagement features 55.

Referring again to FIG. 4A, the first front engagement feature 55 may be disposed at any suitable location on the inner perimeter wall 39 to removably or releasably engage the first back engagement feature 53, and the first front engagement feature 55 may be disposed between the first end 42 and the second end 43 of the inner perimeter wall 39 of the top member 2.

The first front engagement feature 55 may be any feature that may removably or releasably engage the first back engagement feature 53 to removably secure the top member 2 to the bottom member 3. For example, the first front engagement feature 55 may be a slot or a depression formed in the inner perimeter wall 39 of the top member 2, and the first back engagement feature 53 may be a protrusion adapted to be at least partially received into the slot or the depression of the first front engagement feature 55. In other embodiments, the first front engagement feature 55 may be a protrusion formed on the inner perimeter wall 39 of the top member 2, and the first back engagement feature 53 may be a slot or a depression, and the protrusion of the first front engagement feature 55 is adapted to be at least partially received into the slot or the depression of the first back engagement feature 53.

Still referring to FIG. 4A, the protective enclosure 1 may also include a second back engagement feature 56 disposed on an outer surface 58 of the perimeter wall portion 30 of the bottom member 3. The second back engagement feature 56 may engage (or may be adapted to engage) a second front engagement feature 59 disposed on the outer perimeter wall 40 (e.g., disposed on the inner surface 51 of the outer perimeter wall 40) of the top member 2.

As illustrated in FIG. 4A, the second back engagement feature 56 may be disposed at any suitable location on the perimeter wall portion 30 of the bottom member 3, and may be disposed between the first end 48 and the second end 49 of the perimeter wall portion 30. The second front engagement feature 59 may be disposed at any suitable location on the outer perimeter wall 40 to removably or releasably engage the second back engagement feature 56, and the second front engagement feature 59 may be disposed between the first end 45 and the second end 46 of the outer perimeter wall 40 of the top member 2.

The second front engagement feature 59 and the second back engagement feature 56 may be disposed at any suitable corresponding location around the perimeter wall portion 20 of the top member 2 and the perimeter wall portion 30 of the bottom member 3. For example, as illustrated in FIGS. 2C and 3C, the second front engagement feature 59 and the second back engagement feature 56 may extend along one or more of the proximal end portion 21 the distal end portion 22, the first side portion 23, and the second side portion 24 of the perimeter wall portion 20 of the top member 2 and along a corresponding one or more of the proximal end portion 31, the distal end portion 32, the first side portion 33, and the second side portion 34 of the perimeter wall portion 30 of the bottom member 3.

With reference to FIG. 4A, the second front engagement feature 59 may be any feature that may removably or releasably engage the second back engagement feature 56 to removably secure the top member 2 to the bottom member 3. For example, the second front engagement feature 59 may be a ridge 60 (or a protrusion) formed on the outer perimeter wall 40 (e.g., the inner surface 51 of the outer perimeter wall 40) of the top member 2. The second back engagement feature 56 may be a ridge 61 (or a protrusion) formed on the perimeter wall portion 30 (e.g., the outer surface 58 of the perimeter wall portion 30) of the bottom member 3. When the top member 2 is to be removably secured to the bottom member 3, the top member 2 may be aligned with the bottom member 3 such that the second end 49 of the perimeter wall portion 30 of the bottom member 3 is aligned with the channel 50 such that a displacement along the back perimeter axis 47 results in the second end 49 of the perimeter wall portion 30 of the bottom member 3 being inserted into the channel 50. Further displacement results in the second end 49 of the perimeter wall portion 30 of the bottom member 3 displacing normal to the back perimeter axis 47 (in an outward direction away from the electronic device 100) when the first back engagement portion 53 contacts the second end 43 of the inner perimeter wall 39 of the top member 2 and slides along the inside surface 52 of the inner perimeter wall 39. The force of the engagement of the first back engagement portion 53 with the inner perimeter wall 39 may also force the second end 43 of the inner perimeter wall 39 of the top member 2 to displace normal to the inner perimeter axis 41 (in an inward direction towards from the electronic device 100).

When the top member 2 is being displaced towards the bottom member 3 such that the second end 49 of the perimeter wall portion 30 of the bottom member 3 is inserted into the channel 50, the second front engagement feature 59 will initially contact the second back engagement feature 56 to initiate the engagement. That is, with reference to FIG. 4B, a bottom portion 64 of the second front engagement feature 59 may contact a top portion 65 of the second back engagement feature 56. Because the outer perimeter wall 40 is cantilevered, the contact will displace the second front engagement feature 59 (and the second end 46 of the outer perimeter wall 40) normal to the outer perimeter axis 44 (in an outward direction away from the electronic device 100). When the displacement of the top member 2 relative to the bottom member 3 (or vice versa) continues, an apex 66 of the second front engagement feature 59 will become aligned with an apex 67 of the second back engagement feature 56, and further displacement will result in the second front engagement feature 59 engaging the second back engagement feature 56. In some embodiments, this engagement includes a surface 60 on a bottom portion 68 of the second back engagement feature 56 contacting a surface 62 on a top portion 69 of the second front engagement feature 59. Because all or a portion of the surface 60 on a bottom portion 68 of the second back engagement feature 56 and all or a portion of the surface 62 on a top portion 69 of the second front engagement feature 59 are aligned (or generally aligned) and parallel (or generally parallel), and because the displacement of the second end 46 of the outer perimeter wall 40 normal to the outer perimeter axis 44 (in an outward direction away from the electronic device 100) essentially acts as a spring, the second end 46 of the outer perimeter wall 40 is biased to move or displace normal to the outer perimeter axis 44 (in an inward direction towards from the electronic device 100). This biasing action locks or engages the second back engagement feature 56 with the second front engagement feature 59 to releasably secure the top member 2 to the bottom member 3.

One having ordinary skill in the art would recognize that when the top member 2 is displaced away from the bottom member 3 such that the second end 49 of the perimeter wall portion 30 of the bottom member 3 is withdrawn or removed from the channel 50, the engagement process as previously described is reversed and the second back engagement feature 56 disengages with the second front engagement feature 59 and the first front engagement feature 55 disengages with the first back engagement feature 53.

Figure 4B:
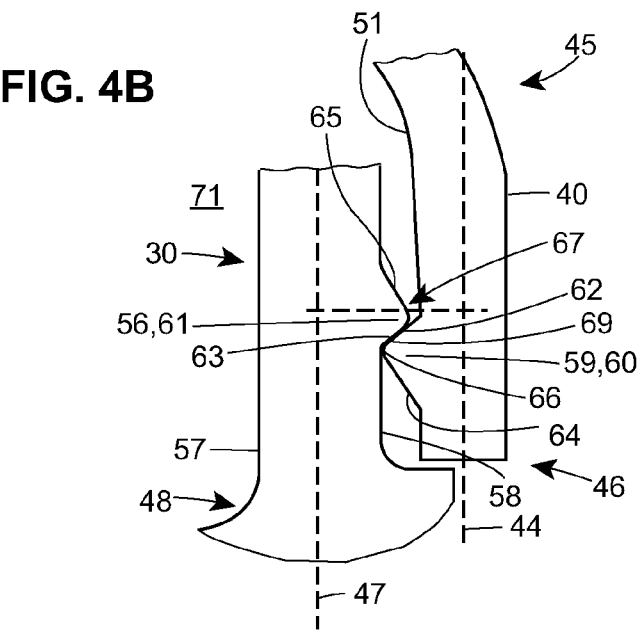
FIG. 4B is a detailed partial cross-sectional view of the embodiment of the protective enclosure of FIG. 1A.

As illustrated in FIG. 4B, the surface 62 of the ridge 60 of the second front engagement feature 59 may be in contact or engage with the surface 63 of the ridge 61 of the second back engagement feature 56 when the second front engagement feature 59 engages the second back engagement feature 56. In some embodiments, the surface 62 of the ridge 60 of the second front engagement feature 59 may be planar (or substantially planar) and the surface 63 of the ridge 61 of the second back engagement feature 56 may be planar (or substantially planar). In the engaged position, the 67 apex of the ridge 61 of the second back engagement feature 56 may be between the apex 66 of the ridge 60 of the second front engagement feature 59 and the second end 49 of the perimeter wall portion 30 of the bottom member 3 (when viewed normal to the back perimeter axis 47).

Referring again to FIG. 4A, the protective enclosure 1 may also include a seal 70 disposed in the channel 50, and a portion of the seal 70 may be disposed adjacent to at least one of the first end 42 of the inner perimeter wall 39 and the first end 45 of the outer perimeter wall 40. When the top member 2 is coupled to the bottom member 3 to enclose the electronic device 100, a portion of the second end 49 of the perimeter wall portion 30 of the bottom member 3 may engage the seal 70 (or a portion of the seal 70) to compress the seal 70 within the channel 50 to prevent liquids from entering an interior portion 71 of the shell of the protective enclosure 1.

So configured, the engagement of the first front engagement feature 55 with the first back engagement feature 53 and the second front engagement feature 59 with the second back engagement feature 56 when the top member 2 is coupled to the bottom member 3 allows for convenient and reliable coupling of the top member 2 and the bottom member 3 in a manner that prevents dust, fluid, moisture and/or debris from entering the interior volume of the protective enclosure 1. The disclosed coupling mechanism also reduces the height of the protective enclosure 1 (along the Z-axis of the reference coordinate system of FIG. 1B), thereby allowing for an advantageously slimmer profile of the protective enclosure 1.

Figure 6:
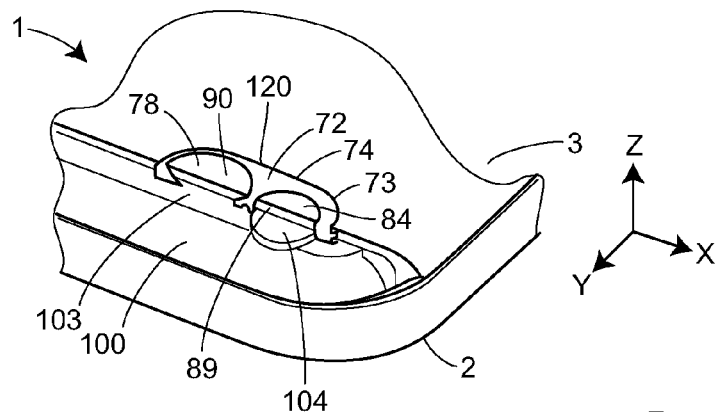
FIG. 6 is partial sectional isometric view of an embodiment of a bottom member of a protective enclosure.
Figure 7A:
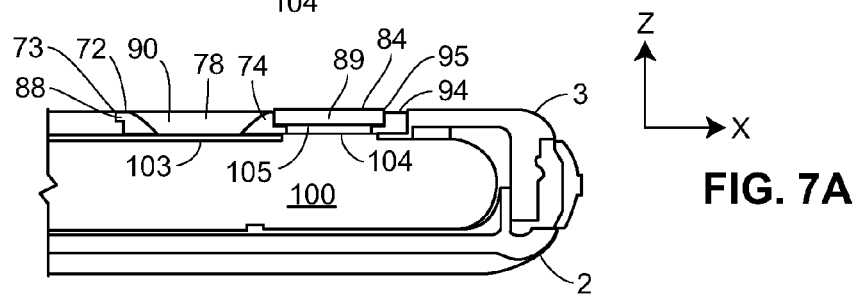
FIG. 7A is a cross-sectional view of the embodiment of the protective enclosure of FIG. 6.
Figure 7B:
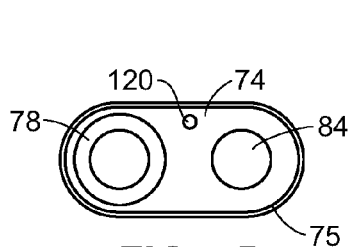
FIG. 7B is a front view of an embodiment of a lens insert body of the embodiment of the protective enclosure of FIG. 6.
Figure 7D:
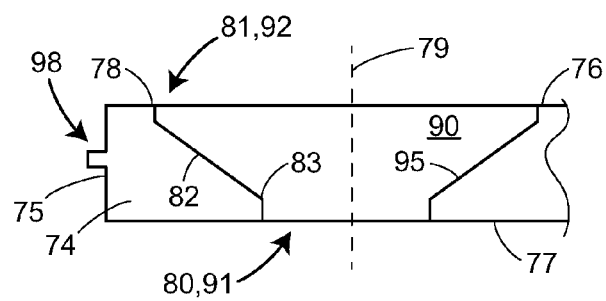
FIG. 7D is a partial cross-sectional view of an embodiment of the lens insert body of FIG. 7B.

As illustrated in FIGS. 6, which illustrates a perspective view of an electronic device 100 disposed within a protective enclosure 1 with a portion of the bottom member 3 removed, the protective enclosure 1 may also include a lens insert member assembly 72 coupled to the bottom member 3. FIG. 7A illustrates a cross-sectional view of the protective enclosure 1, and FIG. 7A illustrates that the lens insert member assembly 72 may be disposed in an aperture 73 in the bottom member 3. Referring to FIG. 7B, a front view of the lens insert member assembly 72 is provided and may include a lens insert body 74 defined by a perimeter surface 75 that corresponds in shape to the aperture 73 in the bottom member 3. Referring to FIG. 7D, which is a partial cross-sectional view of the lens insert member assembly 72, the lens insert member body 74 may have an outside surface 76 and an inside surface 77 each bounded by the perimeter surface 75, and the outside surface 76 may be disposed opposite to inside surface 77. A projection 98 (and/or a seal)

may be disposed around the perimeter surface 75 of the lens insert body 74 and this projection 98 may be received in a corresponding channel (not shown) formed around the aperture 73 formed in the bottom member 3 such that no leakpath is formed between the perimeter surface 75 of the lens insert body 74 and the aperture 73 formed in the bottom member 3. The lens insert body 74 (and/optionally, the projection 98) may be a single, unitary part molded using a dark and/or opaque material. However, the lens insert body 74 may be made from or comprise two or more component parts that are coupled or secured to form the lens body insert 74.

Figure 7C:
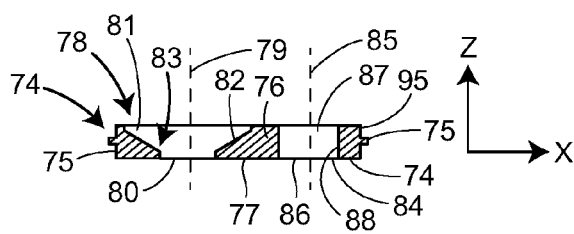
FIG. 7C is a cross-sectional view of the embodiment of the lens insert body of FIG. 7B.

Referring to FIG. 7C, which is a cross-sectional view of the lens insert body 74, the lens insert body 74 may include a flash aperture 78 that may extend along a flash aperture axis 79 from a first end 80 at or adjacent to the inside surface 77 to a second end 81 at or adjacent to the outside surface 76. As illustrated in FIGS. 6 and 7A, the flash aperture 78 may align (or be adapted to be aligned) with a flash 103 of the electronic device 100 when the electronic device 100 is disposed within the shell or enclosure formed by the top member 2 and the bottom member 3. Referring to FIG. 7D, the flash aperture 78 may be defined by a circumferential wall 82 (that may be circumferential or substantially circumferential) that extends from the first end 80 of the flash aperture 78 to the second end 81 of the flash aperture 78.

The circumferential wall 82 may have any shape to allow the flash 103 of the electronic device 100 to suitably illuminate a target object that is to be photographed, and the shape may be an oval or circle. In some embodiments, and with reference to FIG. 7D, a diameter of the circumferential wall 82 of the flash aperture 78 at the first end 80 is greater than a diameter of the flash 103 of the electronic device 100. In addition, a diameter of the circumferential wall 82 of the flash aperture 78 at an intermediate point 83 between the first end 80 and the second end 81 may be greater than the diameter of the circumferential wall 82 of the flash aperture 78 at the first end 80. In addition, a diameter of the circumferential wall 82 of the flash aperture 78 at the second end 81 may be greater than the diameter of the circumferential wall 82 of the flash aperture 78 at the intermediate point 83. In some embodiments without an intermediate point 83, the diameter of the circumferential wall 82 of the flash aperture 78 at the first end 80 is less than the diameter of the circumferential wall 82 of the flash aperture 78 at the second end 81.

In addition, a linear distance between the first end 80 and the intermediate point 83 (along or parallel to the flash aperture axis 79) is less than a linear distance between the second end 81 and the intermediate point 83 (along or parallel to the flash aperture axis 79). The linear distance between the first end 80 and the intermediate point 83 along the flash aperture axis 79 may be between 5% and 25% of a linear distance between the first end 80 and the second end 81 along the flash aperture axis 79. The diameter of the flash aperture 78 at the intermediate point 83 may be between 2% and 10% greater than the diameter of the flash aperture 78 at the first end 80, and the diameter of the flash aperture 78 at the second end 81 may be between 15% and 80% (or between 15% and 50%) greater than the diameter of the flash aperture 78 at the first end 80.

As illustrated in FIG. 7D, the lens insert member assembly 72 may also include a flash insert 90 disposed within (or at least partially within) the flash aperture 78 of the lens insert body 74. The flash insert 90 may extend along the flash aperture axis 79 from a first end 91 at or adjacent to the first end 80 of the flash aperture 78 to a second end 92 at or adjacent to the second end 81 of the flash aperture 78. The flash insert 90 may have a circumferential surface 93 that corresponds to or is identical in shape to the circumferential wall 82 defining the flash aperture 78 such that no leakpath is formed between the circumferential surface 93 of the flash insert 90 and the circumferential wall 82 defining the flash aperture 78. The flash insert 90 may be in-molded or co-molded in the flash aperture 78 to reduce or eliminate any gaps or potential leakpaths between the circumferential surface 93 of the flash insert 90 and the circumferential wall 82 defining the flash aperture 78. The flash insert 90 may be optically-clear. The flash insert 90 may be co-molded using the same material and at the same time as back member 3 is formed through a tunnel or aperture that is formed in the substantially circumferential wall 82.

Referring to FIG. 7C, the lens insert body 74 may also include a camera aperture 84 that extends along a camera aperture axis 85 from a first end 86 at or adjacent to the inside surface 77 to a second end 87 at or adjacent to the outside surface 76. As illustrated in FIG. 7A, the camera aperture 84 is aligned (or is adapted to be aligned) with a camera 104 of the electronic device 100 when the electronic device 100 is disposed within the shell or enclosure formed by the top member 2 and the bottom member 3. As shown in FIG. 7C, the camera aperture 84 may be defined by a circumferential wall 88, and a diameter of the circumferential wall 88 of the camera aperture 84 at the first end 86 may be greater than a diameter of the camera 104 of the electronic device 100.

As illustrated in FIG. 7A, the lens insert member assembly 72 may also include a camera lens 89 disposed within the camera aperture 84. The camera lens 89 may be optically-clear and may be anti-reflectively coated. The camera lens 89 may extend along the camera aperture axis 85 from a first end 94 to a second end 95, and the camera lens 89 may include a circumferential surface 97 that may correspond in shape to the circumferential wall 88 defining the camera aperture 84 such that no leakpath is formed between the circumferential surface 97 of the camera lens 89 and the circumferential wall 88 defining the camera aperture 84. An adhesive may be used between the lens insert body 74 and the camera lens 89 to create a waterproof seal. The adhesive may be located at the first end 94 of the camera lens 89 or at the circumferential surface 93.

As illustrated in FIG. 7A, the first end 94 of the camera lens 89 may be offset from a surface 105 of the camera 104 of the electronic device 100 when the electronic device 100 is disposed within the shell or enclosure formed by the top member 2 and the bottom member 3.

Figure 7E:
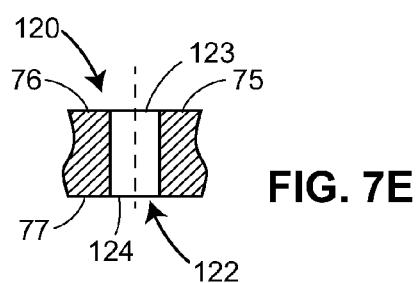
FIG. 7E is a partial cross-sectional view of an embodiment of a lens insert body.

As illustrated in FIG. 7B and FIG. 7E, which is a partial cross-sectional view of the lens insert body 74 of FIG. 7B, the lens insert body 74 may also include a microphone aperture 120 that may extend along a microphone aperture axis 121 from a first end 122 at or adjacent to the inside surface 77 to a second end 123 at or adjacent to the outside surface 76. The microphone aperture 120 may be aligned (or may be adapted to be aligned) with a microphone (not shown) of the electronic device 100 when the electronic device 100 is disposed within the shell or enclosure formed by the top member 2 and the bottom member 3. A waterproof and sound-permeable membrane 124 may extend across the microphone aperture 120 (e.g., in a direction normal to the microphone aperture axis 121) to prevent liquids (or solids) from displacing from the second end 123 of the microphone aperture 120 to the first end 122 of the microphone aperture 120. The membrane 124 may be disposed at any suitable location, and in some embodiments, the membrane may be disposed at or adjacent to the second end 123 of the microphone aperture 120.

Configured as described, the lens insert member assembly 72 simplifies the assembly of the lenses associated with the flash 103 and the camera 104 of the electronic device 100 with the bottom member 3 while also minimizing the size of the lens insert member assembly 72. The shape of the flash aperture 78 also avoids structural interference with the operation of the flash 103 of the electronic device 100, thereby allowing for improved illumination relative to other phone cases.

Figure 8A:
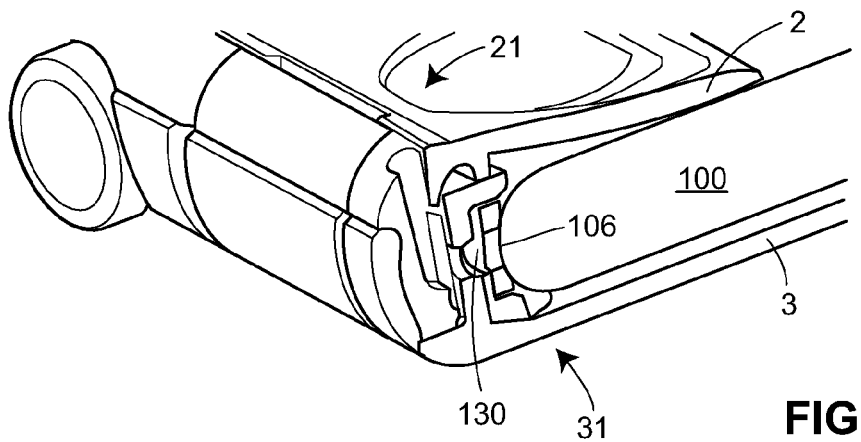
FIG. 8A is an isometric cross-sectional views of an embodiment of a sound path of an embodiment of the protective enclosure.

Referring to FIG. 8A, which is a perspective view of a cross-section of the protective enclosure 1, a first sound path 130 that may be formed in an end portion of one or both of the bottom member 3 and the top member 2 of the protective enclosure 1. For example, as illustrated in the cross-sectional view of FIG. 8B, the first sound path 130 may be formed in, at, or adjacent to the proximal end portion 21 of the top member 2 and/or in, at, or adjacent to the proximal end portion 31 of the bottom member 3. The first sound path 130 may include a first end portion 131 that is open to an interior volume 132 within the shell formed by the top member 2 and the bottom member 3 (when the electronic device 100 is not disposed in the protective enclosure 1) and/or may be adjacent to or immediately adjacent to a portion of a first audio feature 106 of the electronic device 100 when the electronic device 100 is disposed in the protective enclosure 1.

The first sound path 130 may also include a second end portion 133 that is open to an exterior 134 of the shell formed by the top member 2 and the bottom member 3 (or open to the exterior 134 of the protective enclosure 1). The first end portion 131 of the first sound path 130 may be adapted to be aligned with the portion of the first audio feature 106 of the electronic device 100 when the electronic device 100 is disposed within the shell (or the protective enclosure 1), and the second end portion 133 of the first sound path 130 may be on or adjacent to the front portion 18 of the top member 2. Thus, the first sound path 130 may be a channel or opening formed through the top member 2 and/or the bottom member 3 that channels sound emanating from the first audio feature 106 of the electronic device 100 to the second end portion 133 of the first sound path 130. Alternatively, the first sound path 130 may be a channel or opening formed through the top member 2 and/or the bottom member 3 that channels sound emanating from the second end portion 133 (such as by a user speaking) to the first audio feature 106 of the electronic device 100 when the electronic device 100 is disposed within the shell (or the protective enclosure 1). Because the second end portion 133 of the first sound path 130 is disposed in a portion of the top member 2 and/or the bottom member 3 that faces the user when the user is speaking when the electronic device 100 is being used as a telephone, the first sound path 130 routes sound directly towards the user and/or directly from the user to the first audio feature 106 of the electronic device 100. Accordingly, sound clarity is increased and sound quality is improved.

Figure 8B:
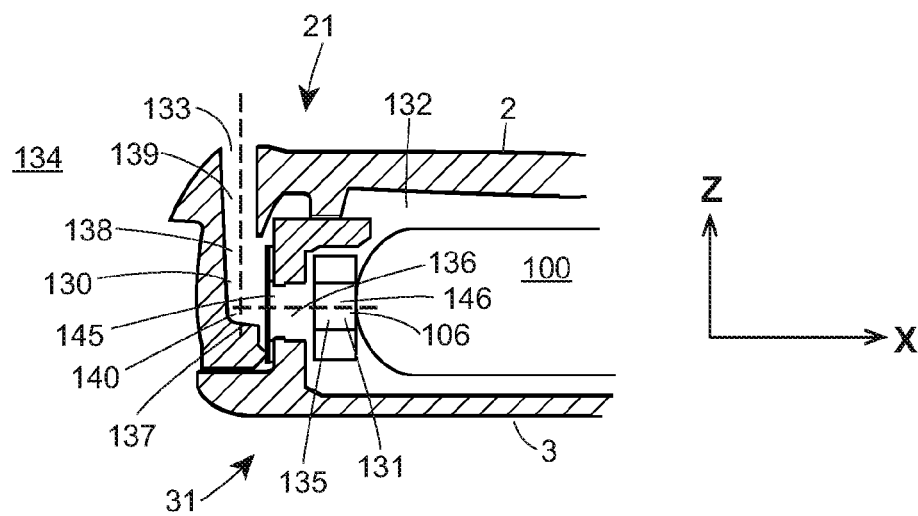
FIG. 8B is cross-sectional views of the embodiment of the sound path of FIG. 8A.

As illustrated in FIG. 8B, the first sound path 130 may include a first segment 135 that extends along a first segment axis 136 from the first end portion 131 to a first intermediate point 137. The first sound path 130 may also include a second segment 138 that may extend along a second segment axis 139 from a second intermediate point 140 to the second end portion 133. In some embodiments, the first intermediate point 137 may be disposed at or adjacent to the second intermediate point 140 such that the first sound path 130 includes only the first segment 135 and the second segment 138. However, the first intermediate point 137 may be disposed remote from the second intermediate point 140 such than one or more additional segments (not shown) are included in the first sound path 130. The first segment axis 136 may not be parallel to or collinearly aligned with the second segment axis 139. In some embodiments, the first segment axis 136 forms an angle between 45° and 105° with the second segment axis 139. In some embodiments, the first segment axis 136 may form an angle between 85° and 95° with the second segment axis 139.

In some embodiments, the first segment axis 136 may be aligned or parallel to a longitudinal axis of the electronic device 100 when the electronic device 100 is disposed within the shell (or the protective enclosure 1). In some embodiments, as illustrated in FIG. 1A, the top member 2 and the bottom member 3 may each extend along a reference longitudinal axis 141 (that may extend from the proximal end portion 21, 31 to the distal end portion 22, 32), and the reference longitudinal axis 141 may be aligned with or parallel to the Y-axis of the reference coordinate system of FIG. 8B and/or with the longitudinal axis of the electronic device 100. In some embodiments, the first segment axis 136 may be aligned or parallel to the reference longitudinal axis 141, or may form an angle between 0° to 10° with the reference longitudinal axis 141.

In some embodiments, as illustrated in FIG. 1A, a reference transverse axis 142 may extend along the top member 2 and the bottom member 3 and the reference transverse axis 142 may extend normal to the reference longitudinal axis 141. The reference transverse axis 142 may extend from the first side portion 23, 33 (of the top member 2 and bottom member 3, respectively) to the second side portion 24, 34 (of the top member 2 and bottom member 3, respectively), and the reference transverse axis 142 may be aligned with or parallel to the X-axis of the reference coordinate system of FIG. 1A. The reference longitudinal axis 141 and the reference transverse axis 142 form a reference plane 158 (of FIG. 1C) that is parallel to the X-Y plane of the reference coordinate system of FIGS. 1A and 8B. In some embodiments, and as illustrated in FIG. 8B, the second segment axis 139 may be normal or substantially normal to the reference plane 158. In some embodiments, the second segment axis 139 may form an angle between 45° and 120° with the reference longitudinal axis 141 and/or the first segment axis 136 (or between 0° and 10° with an axis that is normal to the reference plane 158 and/or that is parallel to the Z-axis of the reference coordinate system of FIG. 8B). The first segment axis 136 of first sound path 130 may be disposed a first distance from the reference longitudinal axis 141.

As illustrated in FIG. 8B, a first membrane 145 may be disposed within the first sound path 130. The first membrane 145 may be made from a mesh material that is liquid permeable, and the first membrane 145 may prevent debris from passing through the first sound path 130. The first membrane 145 may be disposed in the first segment 135, and the first membrane 145 may be disposed at or adjacent to the first intermediate point 137 of the first segment axis 136.

A second membrane 146 may be disposed within the first sound path 130. The second membrane 146 may be made from a semi-permeable material that is liquid impermeable, and the second membrane 146 may prevent liquid from passing through the first sound path 130. The second membrane 146 may be disposed in the first segment 135, and the second membrane 146 may be disposed between the first membrane 145 and the first end portion 131 or between the intermediate point 137 and the first end portion 131 of the first sound path 130.

Figure 8C:
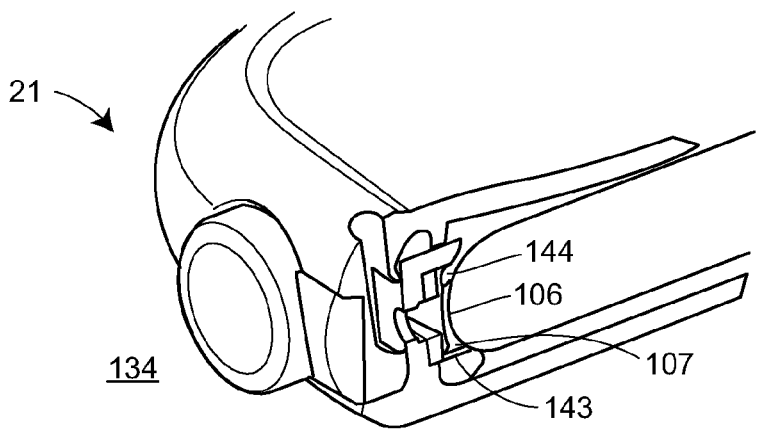
FIG. 8C is an isometric cross-sectional views of another embodiment of a sound path of an embodiment of the protective enclosure.

In some embodiments, as illustrated in FIGS. 1A and 8C, the protective enclosure 1 may include a second sound path 143 that may be identical or substantially identical to the first sound path 130. In some embodiments, the second sound path 143 may be symmetrically disposed from the first sound path 130 about the reference longitudinal axis 141 so as to be a mirror image of the first sound path 130. As illustrated in FIG. 8C, the second sound path 143 may have a first end portion 144 (that may be identical to the first end portion 131 of the first sound path 130), and the first end portion 144 of the second sound path 143 may be adapted to be aligned with a portion of a second audio feature 107 of the electronic device 100 when the electronic device 100 is disposed within the shell. Further sound paths (not shown) are also contemplated. These further sound paths may have any one or more features of the sound paths discussed herein. In some embodiments, the first audio feature 106 may be a speaker or a microphone, and the second audio feature 107 may be a speaker or a microphone. In some embodiments, the first audio feature 106 or the second audio feature 107 may be a microphone and speaker located on the electronic device 100 in close proximity such that the sound path 130 serves both the microphone and speaker.

Figure 9A:
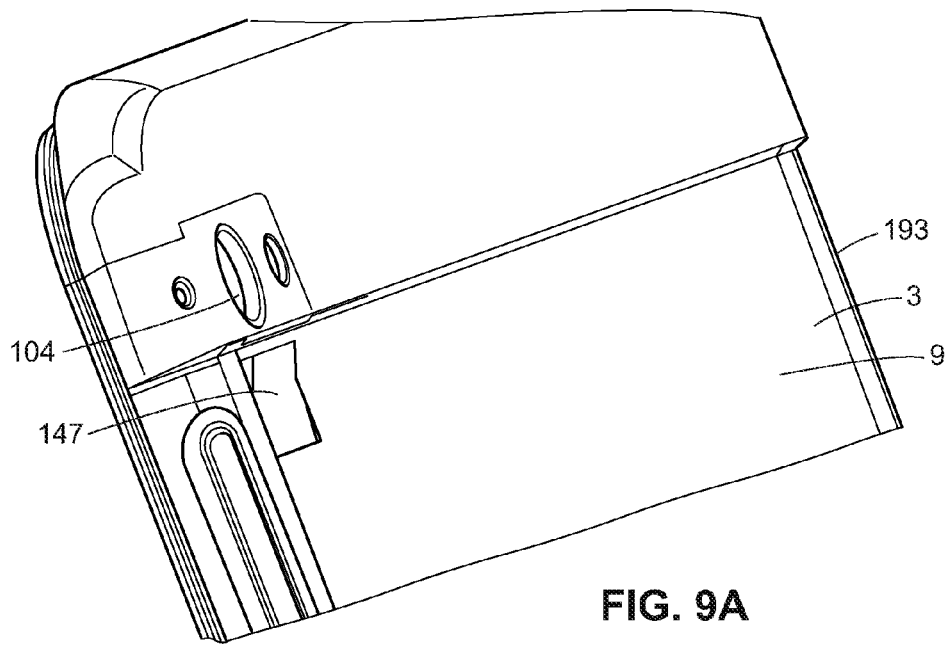
FIG. 9A is an isometric view of an embodiment of a back member of a protective enclosure having a lens overlay.
Figure 9B:
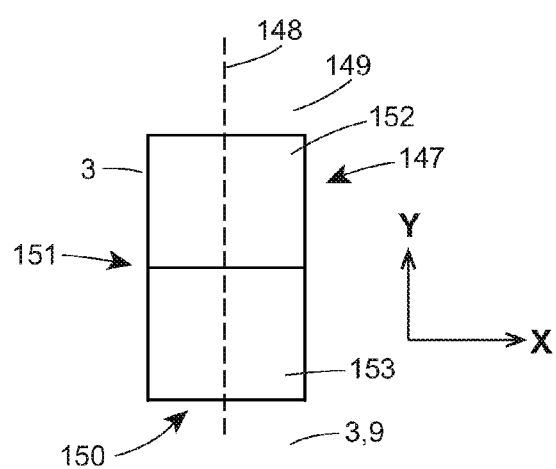
FIG. 9B is a front view of an embodiment of the lens overlay of FIG. 9A.

As illustrated in FIG. 9A, which illustrates a partial back perspective view of the protective enclosure 1, the protective enclosure 1 may also include a flash overlay 147 formed on the back member 3 (e.g., on the back portion 9 of the back member 3) that is adapted to overlay the flash 103 of the electronic device 100. In some embodiments, the flash overlay 147 may be integrally formed with a portion of the back member 3, and the portion of the back member 3 (and the flash overlay 147) may be made from an optically-clear material or from a material having preferred optical qualities. As illustrated in FIG. 9B, which illustrates a front view of the flash overlay 147, the flash overlay 147 may extend along a main axis 148 from a first end 149 to a second end 150. The main axis 148 may be parallel to or aligned with the Y-axis of the reference coordinate system of FIG. 9B and/or with the reference longitudinal axis 141 of FIG. 1A. An intermediate point 151 may be disposed between the first end 149 and the second end 150. A first portion 152 of the flash overlay 147 may extend between the first end 149 and the intermediate point 151 and a second portion 153 of the flash overlay 147 may extend between the intermediate point 151 and the second end 150. The first portion 152 of the flash overlay may have a shape (e.g., a cross-sectional shape when viewed normal to the main axis 148) that is different than a shape (e.g., a cross-sectional shape when viewed normal to the main axis 148) of the second portion 153 of the flash overlay.

Figure 9C:
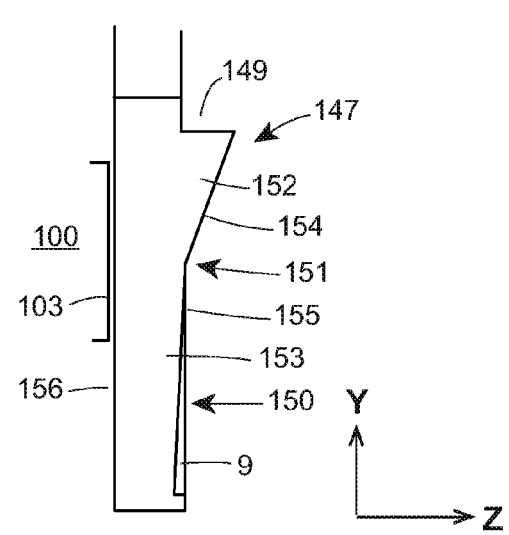
FIG. 9C is a front view of an embodiment of the lens overlay of FIG. 9A

The first portion 152 may include a convex surface that may have a generally triangular shape when viewed in cross-section along the X-axis. That is, in the cross-sectional view of FIG. 9C that is viewed along the X-axis of the reference coordinate system of FIG. 9B, a surface edge 154 of the first portion 152 decreases in height from the first end 149 to the intermediate point 151, and the surface edge 154 may have a convex shape. The first end 149 may be offset from the back portion 9 of the bottom member 3 along the Z-axis of the reference coordinate system of FIG. 9C. The intermediate point 151 may be adjacent to the back portion 9 of the bottom member 3 when viewed in cross-section along the X-axis. The geometry (e.g., the convex curvature) of the first portion 152 evens out the illumination of the flash 103 as the light passes through the first portion 152 and prevents a "dead zone" of shadow caused by case geometry that extends between the flash 103 and the camera 104.

The second portion 153 may include a concave surface when viewed in cross-section along the X-axis. That is, when viewed along the X-axis of the reference coordinate system of FIG. 9B, a surface edge 155 of the second portion 153 has a concave shape, and the second end 150 and the intermediate point 151 may both be at or adjacent to the back portion 9 of the bottom member 3 when viewed in cross-section along the X-axis. In some embodiments, the second end 150 may be recessed from the back portion 9. The concave curvature of the second portion 153 may transition to the flat surface at the second end 150 of the second portion 153 to smooth out the illumination pattern of the flash in the field of view. Accordingly, the cross-sectional shape of the first portion 152 and the second portion 153 may cooperate to achieve uniform target illumination despite the presence of interfering or obstructing case elements.

When the electronic device 100 is disposed in the shell, the flash 103 of the electronic device 100 is disposed adjacent to the first portion 152 and/or the second portion 153 of the flash overlay 147. That is, a bottom surface 156 of the flash overlay 147 may be in contact with or adjacent to the flash 103 of the electronic device 100 such that light (e.g., all light) exiting the flash 103 passes through one or both of the first portion 152 and/or the second portion 153.

Figure 9D:
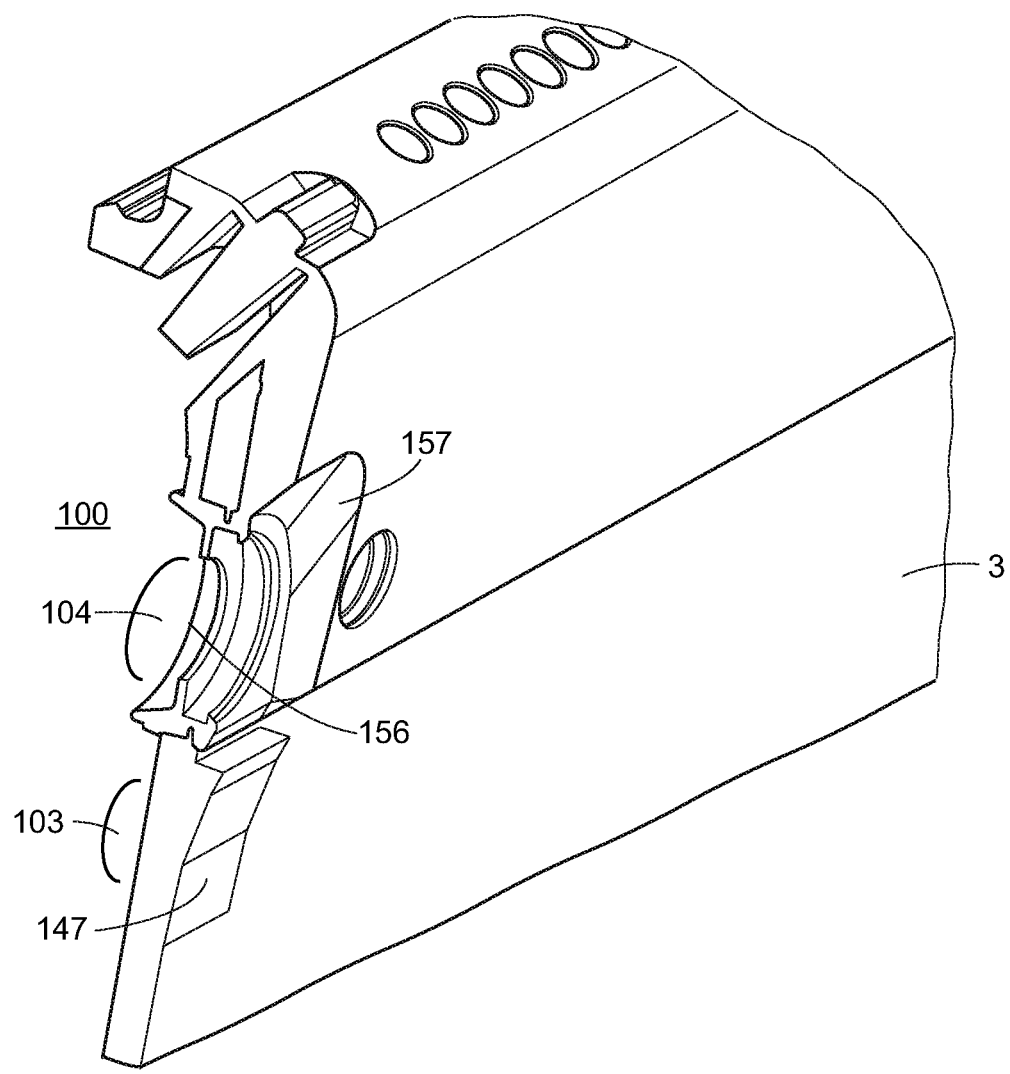
FIG. 9D is an isometric view of an embodiment of a back member of a protective enclosure having a lens overlay.
Figure 9E:
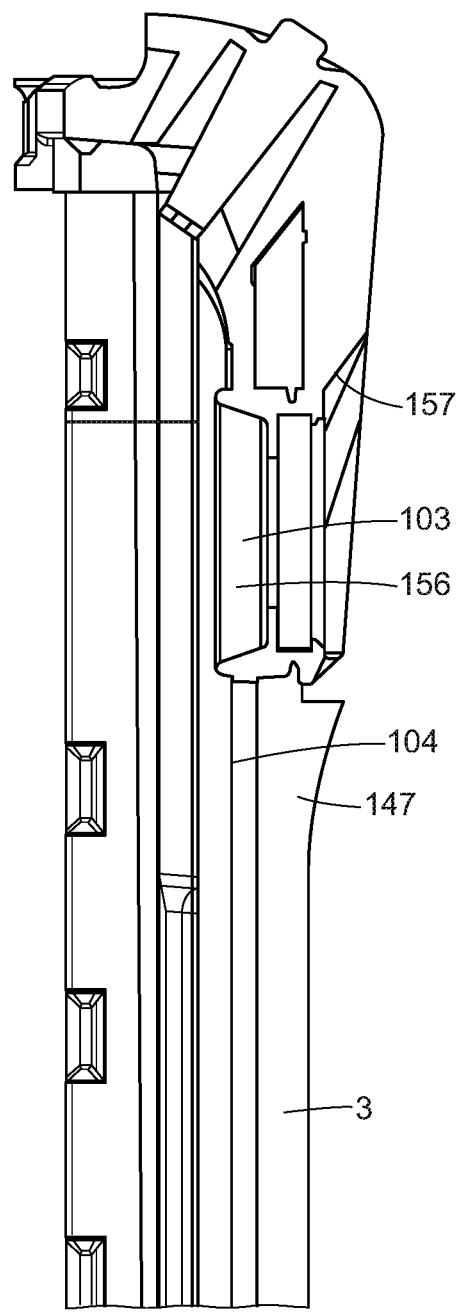
FIG. 9E is a cross-sectional view of an embodiment of a back member of a protective enclosure having a lens overlay.

As illustrated in the partial cross-sectional view of FIG. 9D, the camera 104 of the electronic device 100 may be adjacent to the flash 103 and positioned above the flash 103 (e.g., closer to the distal end portion 32 of the bottom member 3). An axis extending through a center point of the cameral 104 and the flash 103 may be parallel to the reference longitudinal axis 141 of FIG. 1A. The camera 104 may be aligned with a camera aperture 156 that may be formed in an opaque part of the bottom member 3. As illustrated in the cross-sectional view of the bottom member 3 of FIG. 9E, the camera aperture 156 may be at least partially surrounded by a recessed area 157 that prevents the material of the bottom member 3 from limiting or interfering with the field of view of the camera 104.

Referring to FIG. 2C, the protective enclosure 1 may also include the seal 159 disposed on the top member 2 and adapted to seal with an interactive screen 101 of the electronic device 100 to eliminate a membrane covering the interactive screen 101 and to prevent leaks between the interactive screen 101 and the top member 2.

As illustrated in FIG. 1A, the window 160 may be formed in the top member 2 (e.g., the front portion 18 of the top member 2) and the window 160 may be defined by the perimeter edge 161. The perimeter edge 161 may be adapted to correspond in shape to the interactive screen 101 of the electronic device 100 (or a portion of the interactive screen 101 of the electronic device 100, and the perimeter edge 161 may have any shape to allow access to all or a portion of the interactive screen 101 of the electronic device 100. In some embodiments, as illustrated in FIG. 1A, the perimeter edge 161 may have a rectangular shape (when viewed normal to the reference plane 158 formed by the reference longitudinal axis 141 and the reference transverse axis 142 of FIG. 1A), and the perimeter edge 161 may include a top edge 162 extending along a top edge axis 163. The top edge axis 163 may be generally parallel to the reference transverse axis 142. The perimeter edge 161 may also include a bottom edge 164 extending along a bottom edge axis 165. The bottom edge axis 165 may be generally parallel to the reference transverse axis 142 and may be offset from the top edge axis 163 along the reference longitudinal axis 141. The perimeter edge 161 may further include a first side edge 166 extending along a first side edge axis 167, and the first side edge axis 167 may be generally parallel to the reference longitudinal axis 141. The perimeter edge 161 may additionally include a second side edge 168 extending along a second side edge axis 169, and the second side edge axis 169 may be generally parallel to the reference longitudinal axis 141 and offset from the first side edge axis 167 along the reference transverse axis 142.

Referring to FIG. 2C, the seal 159 may be disposed along a bottom surface 170 of at least a portion of the front portion 9 adjacent to the perimeter edge 161 defining the window 160, and the seal 159 may correspond or generally correspond in shape to the perimeter edge 161. In some embodiments, the seal 159 may extend around all (or a portion of) the perimeter edge 161. When the electronic device 100 is disposed in the shell or enclosure formed by the top member 2 and the bottom member 3, the seal 159 may be disposed between the bottom surface 170 of the front portion 9 and the interactive screen 101 of the electronic device 100 so as to form a fluid-tight seal between the bottom surface 170 of the front portion 9 and the interactive screen 101 of the electronic device 100.

In the embodiment of FIG. 2C, the seal 159 may include a top segment 171 at or adjacent to the top edge 162 of the perimeter edge 161 and a bottom segment 172 at or adjacent to the bottom edge 164 of the perimeter edge 161. The seal 159 may also include a first side segment 173 at or adjacent to the first side edge 165 of the perimeter edge 161, and a second side segment 174 at or adjacent to the second side edge 168 of the perimeter edge 161.

Figure 10A:
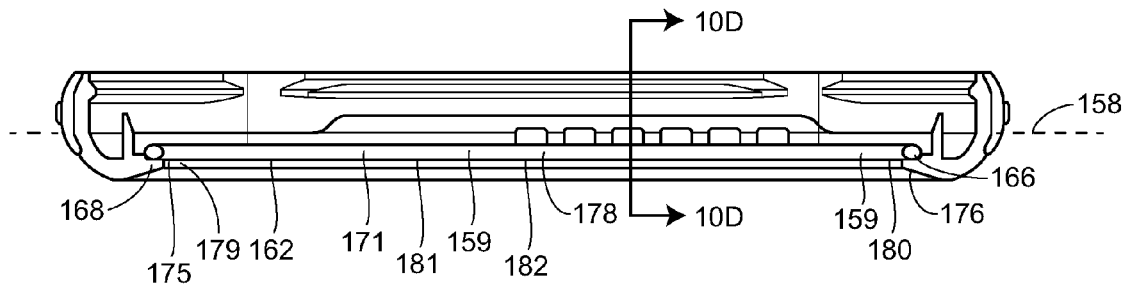
FIG. 10A is a cross-sectional view of an embodiment of a top member of a protective enclosure having a seal disposed on the top member.

As illustrated in FIG. 10A, which illustrates a cross-sectional view of the top member 2, the top segment 171 of the seal 159 may include a first end portion 175, a second end portion 176, and a main portion 177 between the first end portion 175 and the second end portion 176. The first end portion 175 may be disposed adjacent to the second side edge 168 and the second end portion 176 may be disposed adjacent to the first side edge 165. The main portion 177 of the top segment 171 may have an arcuate, curved, or cambered shape when viewed along the reference plane 158 such that at least a midpoint 178 (or apex) of the top segment 171 is adapted to be biased into contact with a portion of the interactive screen 101 of the electronic device 100, and this biasing force acts as a spring to maintain sealing engagement between the top segment and the interactive screen 101 of the electronic device 100. Said another way, the midpoint 178 may be closer to the reference plane 158 (or to the back portion 9 of the bottom member 3) than either or both of the first end portion 175 and the second end portion 176. The top segment 171 may be symmetrical about the reference longitudinal axis 141.

In addition, all or a portion of the top edge 162 (and the top edge axis 163) of the perimeter edge 161 may be non-linear and have an arcuate, curved, or cambered shape that may be similar or identical to the shape of the top segment 171—or the main portion 177 of the top segment 171—when viewed along the reference plane 158. That is, as illustrated in FIG. 10A, the top edge 162 (and the top edge axis 163) may include a first end portion 179, a second end portion 180, and a main portion 181 between the first end portion 179 and the second end portion 180. The first end portion 179 may be disposed adjacent to first end portion 175 of the top segment 171 and the second side edge 168 of the perimeter edge 161. The second end portion 180 may be disposed adjacent to the second end portion 176 of the top segment 171 and the first side edge 165 of the perimeter edge 161.

The main portion 181 of the top edge 162 may have an arcuate or cambered shape (or the shape of an arc or a segment of a circle) when viewed along the reference plane 158 such that at least a midpoint 182 (or apex) of the top edge 162 is adapted to be biased into contact with a portion of the interactive screen 101 of the electronic device 100 and to bias the midpoint 178 of the top segment 171 into contact with a portion of the interactive screen 101 of the electronic device 100. As illustrated in FIG. 10D, which is a cross-sectional view taken from FIG. 10A, the portion of the front portion 18 that terminates in the top edge 162 extends away from the distal end portion 22 of the top member 2 is cantilevered, so the cambered shape provides a downward biasing force (for example, a leaf spring force) in this portion of the front portion 18 that is maximized at or adjacent to the midpoint 182 of the top edge 162, and this maximum force provides for a sealing force that is greater than a hydrostatic pressure force and a desired depth when the protective enclosure is submerged in liquid at the desired depth. One having ordinary skill in the art would recognize that the arcuate, curved, or cambered shape (and the pre-deflection enabled by the shapes) provides optimal sealing forces that can facilitate thinner cases without compromising sealing forces.

Figure 10B:
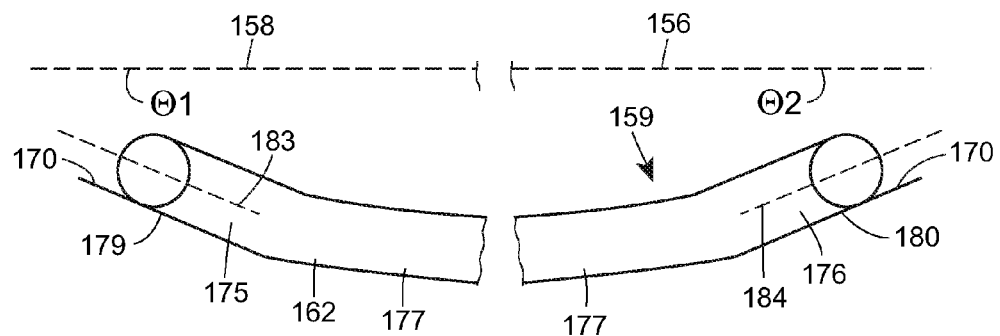
FIG. 10B is a partial cross-sectional view of an embodiment of the seal of FIG. 10A

As illustrated in FIG. 10B, which illustrates a segmented cross-section of the seal 159, the first end portion 175 of the top segment 171 may extend along a linear first end portion top axis 183, and the first end portion top axis 183 may form a first acute angle $\theta 1$ relative to the reference plane 158 when viewed along the reference plane 158 and/or the reference longitudinal axis 141. In addition the second end portion 176 of the top segment 171 may extend along a linear second end portion top axis 184, and the second end portion top axis 184 may form a second acute angle $\theta 2$ relative to the reference plane 158 when viewed along the reference plane 158 and/or the reference longitudinal axis 141. Each of the first acute angle $\theta 1$ and the second acute angle $\theta 2$ may be between 1° and 20°. In some embodiments, the first acute angle $\theta 1$ and the second acute angle $\theta 2$ may be equal.

The bottom segment 172 of the seal 159 and the bottom edge 164 may also be shaped similarly or identically to the top segment 171 and top edge 162 described above. In addition, one or both of the first side segment 174 and the second side segment 174 of the seal 159 (and the first side edge 165 and the second side edge 168) may be shaped similarly or identically to the top segment 171 and top edge 162 described above. However, in some embodiments, at least one of the bottom segment 172 of the seal 159 (and the bottom edge 164) and the first side segment 174 and the second side segment 174 of the seal 159 (and the first side edge 165 and the second side edge 168) may not be cambered or may not have end portions extending along an axis that makes an acute angle with the reference plane 158.

The skilled person would recognize that shape of one or more of the edges of the perimeter edge 161 may require small variations in the shape of the corresponding portion of the seal 159. For example, as illustrated in FIG. 2C, the bottom edge 164 of the perimeter edge and the corresponding bottom segment 172 may include a depressed portion 185 that may correspond in shape to a depressed feature on the front of the electronic device 100 to maintain a sealing engagement through or over such a depressed feature on the front of the electronic device 100.

Figure 10C:
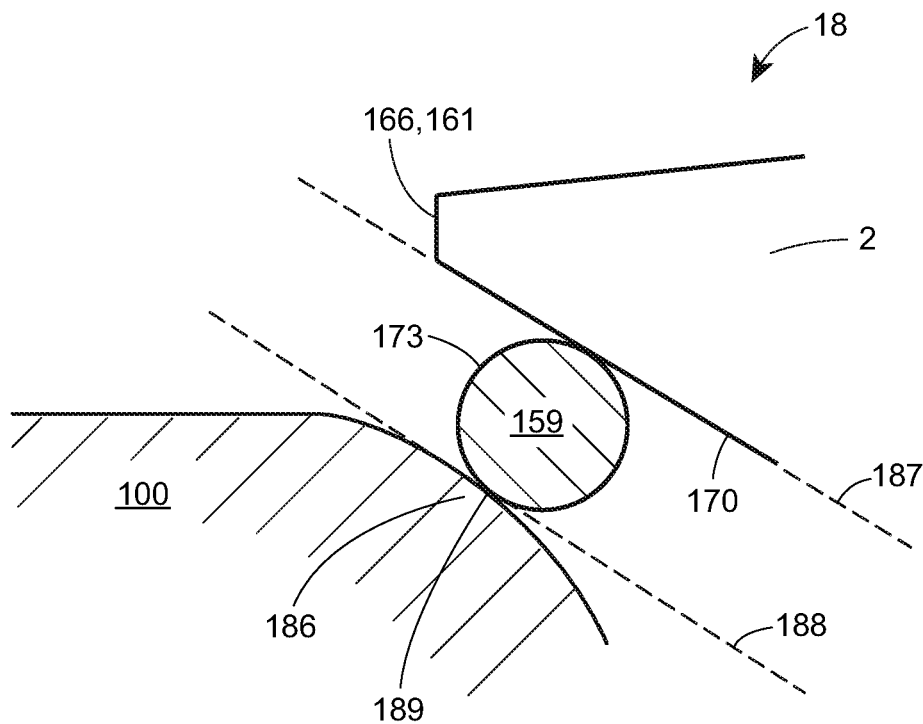
FIG. 10C is a partial cross-sectional view of an embodiment of the seal of FIG. 10A.
Figure 10D:
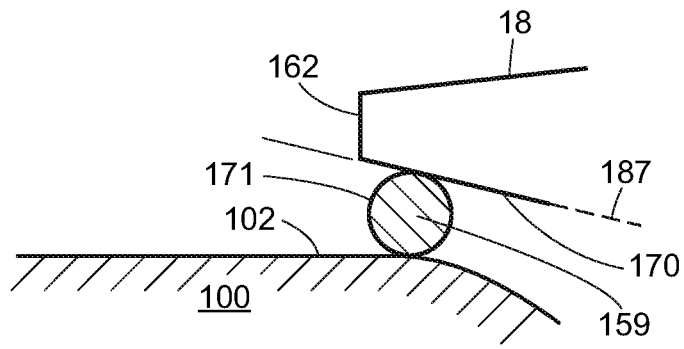
FIG. 10D is a partial cross-sectional view of an embodiment of the seal of FIG. 10A taken along line 10D-10D of FIG. 10A.

As illustrated in the partial cross-sectional view of the top member 2 and the seal 159 of FIG. 10C, at least one side portion 186 of the interactive screen 101 of the electronic device 100 may be curved, angled, or contoured and these side portions 186 may be disposed adjacent to the first side edge 166 and/or the second side edge 168 (and/or the top edge 162 and/or the bottom edge 164). A portion of the bottom surface 170 of each of the first side edge 166 and/or the second side edge 168 (and/or the top edge 162 and/or the bottom edge 164) may extend along an axis 187 that may be parallel to an axis 188 that is tangent to the side portion 186 of the interactive screen 101 at the contact point 189 of the first side segment 173/second side segment 174 of the seal 159. The arrangement of the axis 187 and the axis 188 ensures proper sealing along the one or more curved side portions 186 of the interactive screen 101.

The seal 159 be made from or comprise any suitable material or combination of materials to form a fluid-tight seal between the bottom surface 170 of the front portion 9 and the interactive screen 101 of the electronic device 100 when the electronic device 100 is disposed in the shell or enclosure formed by the top member 2 and the bottom member 3. For example, the seal 159 may be a liquid elastomer applied to and cured to at least a portion of the bottom surface 170 of the front portion 18 of the top member 2.

In some embodiments, the top member 2 (or a portion of the top member 2) and/or the bottom member 3 (or a portion of the bottom member 3) may have be made from or comprise a transparent or translucent material. For example, as illustrated in FIG. 9A, a bottom portion 193 of the bottom member 3 may be made from or comprise a transparent or translucent material. In some embodiments, nanoclay anti-scratch resin additives may be added to the material comprising the transparent material of the bottom member 3 and/or the top member 2. By blending the nanoclay additive into the base resin used to mold the bottom member 3 and/or the top member 2, the surfaces of the bottom member 3 and/or the top member 2 achieve improved scratch & mar resistance. The nanoclay additive can be used instead of hardcoated labels or paints for surface protection that are typically used, thereby reducing cost and complexity of manufacture. Importantly, the nanoclay additive has little effect on mechanical, optical or physical properties of the base resin.

Figure 11A:
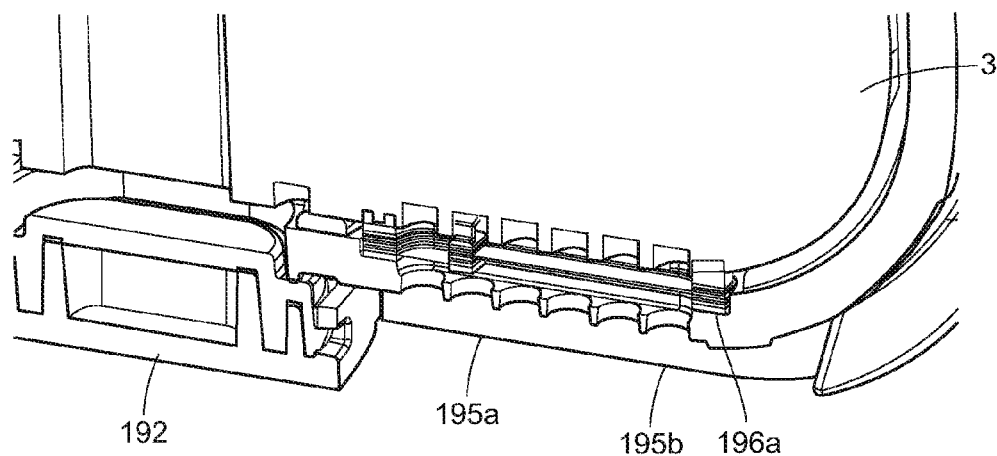
FIG. 11A is an isometric cross-sectional view of an embodiment of a protective enclosure having an embodiment of a seal assembly.
Figure 11B:
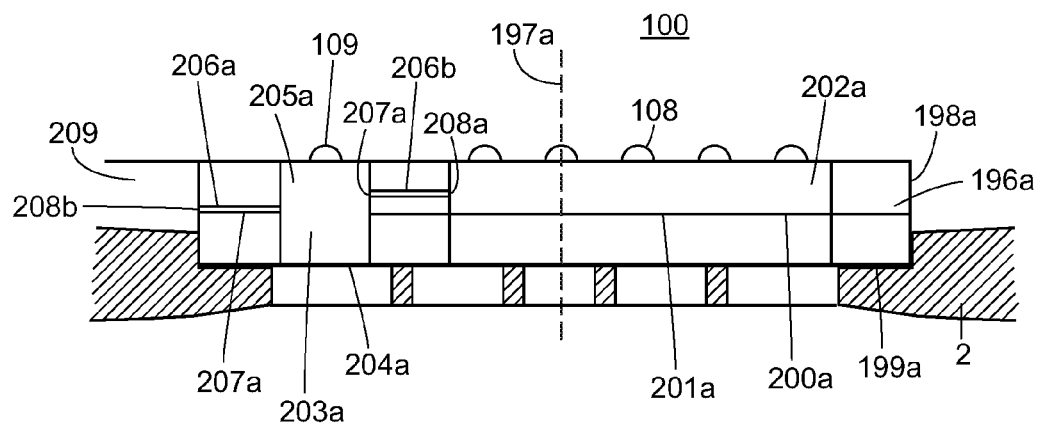
FIG. 11B is a cross-sectional view of the embodiment of the seal assembly of FIG. 11A.
Figure 11C:
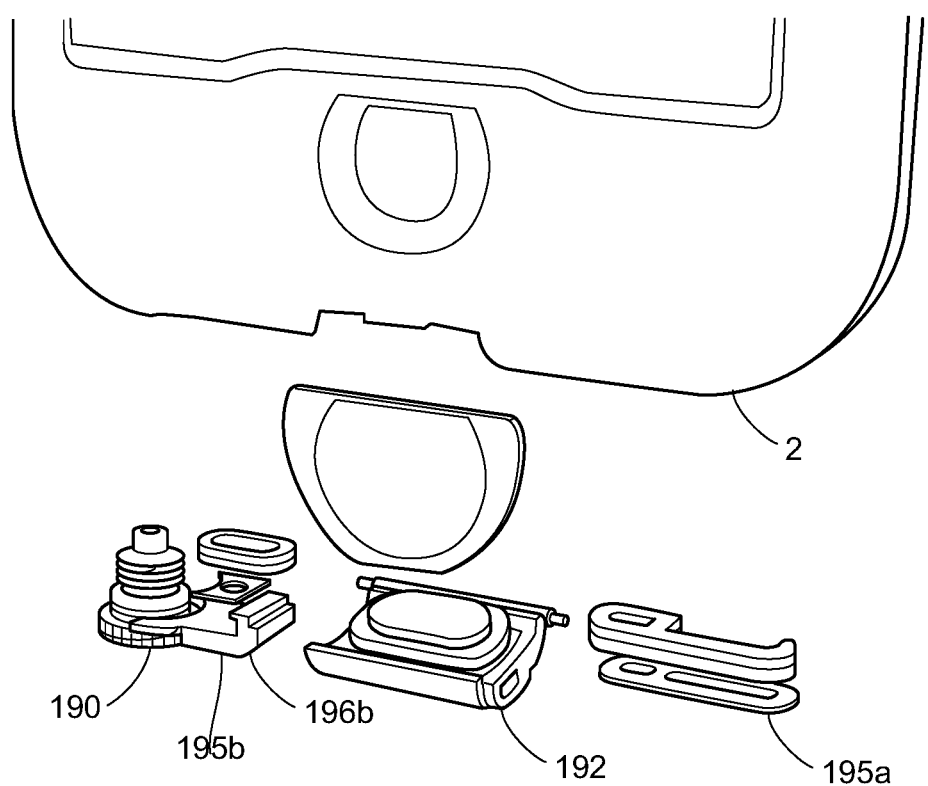
FIG. 11C is an isometric exploded view of a bottom portion of an embodiment of a protective enclosure having a seal assembly.
Figure 11D:
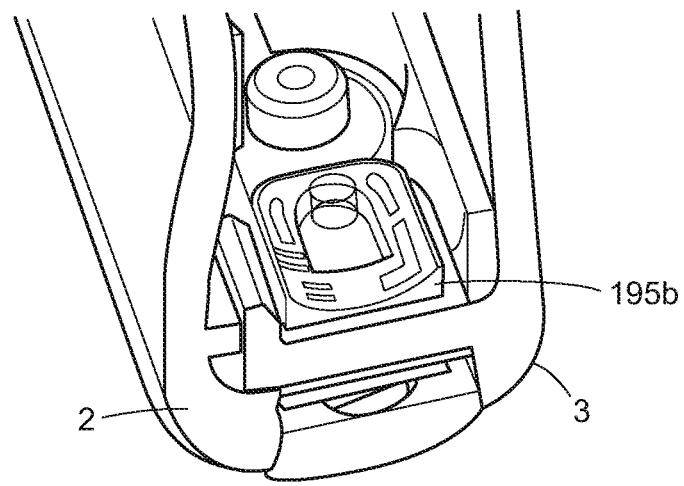
FIG. 11D is an isometric cross-sectional view of an embodiment of a protective enclosure having a further embodiment of a seal assembly.
Figure 11E:
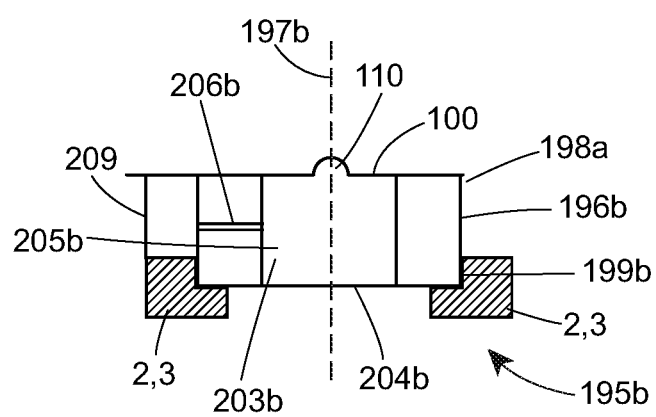
FIG. 11E is a cross-sectional view of the embodiment of the seal assembly of FIG. 11D.

FIG. 11A illustrates a partial cross-sectional view of an embodiment of the protective enclosure 1 that may include a seal assembly 195a disposed within an aperture formed in the top member 2 and/or the bottom member 3 of the protective enclosure 1, and the seal assembly 195a may have a capillary leak path to relieve pressure within a volume of the seal assembly 195a. An exploded view of such a seal assembly 195a is illustrated in FIG. 11C. In the cross-sectional view of FIG. 11B, the seal assembly 195a may include a seal body 196a that extends along a seal axis 197a from a first end 198a to a second end 199a. The first end 198a of the seal body 196a may be in sealing engagement with a portion of the electronic device 100 when the electronic device 100 is disposed within the protective enclosure 1 such that the electronic device 100 compresses the seal body 196a along the seal axis 197a to achieve a tight seal. The second end 199a of the seal body 196a may abut, contact, or rest against a portion of the top member 2 and/or the bottom member 3 to provide support against the compressive force provided by the electronic device 100 on the seal body 196a. The seal body 196a (or portions of the seal body 196a) may be made from or comprise a molded silicone or other rubber material (or may be made from a sandwich or a laminate assembly of component parts that include a molded silicone material). Part of the sandwich or laminate forming the seal body 196a may be plastic layers to give structure to the seal body 196a and/or adhesive layers to bond adjacent layers.

The seal body 196a may define at least one first seal aperture 200a that surrounds or is adapted to surround a first audio feature 108 (which may be a speaker) of the electronic device 100, and the first seal aperture 200a may extend from the first end 198a to the second end 199a of the seal body 196a. The seal body 196a may surround the entire first audio feature 108 and may form a perimeter around the first audio feature 108 to define the first seal aperture 200a. The seal body 196a may partially surround the entire first audio feature 108 and may form a partial perimeter around the first audio feature 108 to define the first seal aperture 200a. A first membrane 201a may extend across the first seal aperture 200a (and may be normal to the seal axis 197a), and the first membrane 201a may be disposed between the first end 198a to the second end 199a of the seal body 196a. The first membrane 201a may be liquid impermeable. The portion of the first seal aperture 200a between the first end 198a and the first membrane 201a may define a first seal body volume 202a.

The seal body 196a may additionally define a second seal aperture 203a that surrounds or is adapted to surround a second audio feature 109 (which may be a microphone) of the electronic device 100, and the second seal aperture 203a may extend from the first end 198a to the second end 199a of the seal body 196a. The seal body 196a may surround the entire second audio feature 109 and may form a perimeter around the second audio feature 109 to define the second seal aperture 203a. A second membrane 204a may extend across the second seal aperture 203a (and may be normal to the seal axis 197a), and the second membrane 204a may be disposed at or adjacent to the second end 199a of the seal body 196a. The second membrane 204a may be liquid impermeable (and some embodiments may also be air impermeable). The portion of the second seal aperture 203a between the first end 198a and the second membrane 204a may define a second seal body volume 205a. The second membrane 204a may be an acoustic membrane. The second membrane 204a may be an expanded PTFE material.

In use, pressure may increase in the second seal body volume 205a, and this pressure can adversely affect microphone performance and the microphone's ability to capture some audio frequencies. Accordingly, a leak channel 206a is provided in the seal body 196a, and the leak channel 206a may have a first end 207a open to the second seal body volume 205a and a second end 208a open to the first seal body volume 202a. The leak channel 206a may be sized and configured to allow pressure to be relieved in the second seal body volume 205a without allowing sound from the first seal body volume 202a to travel through the leak channel 206a and into the second seal body volume 205a and thereby degrade the audio signal captured from the second audio feature 109 (e.g., the microphone 109). In addition, the leak channel 206a may be sized and configured to allow pressure to be relieved in the second seal body volume 205a without allowing moisture to travel into the second seal body volume 205a. The leak channel 206a may have any suitable cross-sectional shape (e.g., circular or a slot-shape) and any suitable size to allow air to escape from the second seal body volume 205a without allowing (or limiting) sound (or moisture) into the second seal body volume 205a. For example, the leak channel 206a may have a diameter between 0.25 mm and 0.50 mm. The leak channel 206a may extend in any suitable direction, such as normal to the seal axis 197a.

In some embodiments, the first end 207a of the leak channel 206a may be open to the second seal body volume 205a and the second end 208a may be open to an interior volume 209 defined in the interior of the protective enclosure 1. In some embodiments, the seal body 196a includes only a single leak channel 206a, and the second end 208a may be open to the interior volume 209 or the first seal body volume 202a. In other embodiments, the seal body 196a includes two or more leak channels 206a, and each corresponding second end 208a may be open to the interior volume 209 and/or the first seal body volume 202a. The leak channel 206a may extend in any suitable direction, and may extend normal or substantially normal to the seal axis 197a.

As illustrated in the perspective cross-sectional view of the protective enclosure 1 of FIG. 11 D (and as shown in more detail in the cross-sectional view of FIG. 11 E), an embodiment of the seal body 196b may define a single seal aperture 203a that surrounds or is adapted to surround a third audio feature 110 (which may be a microphone) of the electronic device 100, and the seal aperture 203b may extend from the first end 198b to the second end 199b of the seal body 196b. The seal body 196b may surround the entire third audio feature 110 and may form a perimeter around the third audio feature 110 to define the seal aperture 203b. A third membrane 204b may extend across the seal aperture 203b (and may be normal to the seal axis 197b), and the third membrane 204b may be disposed at or adjacent to the second end 199a of the seal body 196a. The third membrane 204b may be liquid impermeable (and may optionally be air-impermeable). The portion of the seal aperture 203b between the first end 198b and the third membrane 204b may define a third seal body volume 205b. The third membrane 204b may be an acoustic membrane. At least one leak channel 206b may be provided in the seal body 196b, and the leak channel 206b may have a first end 207b open to the third seal body volume 205b and a second end 208b open to the interior volume 209 defined in the interior of the protective enclosure 1. The at least one leak channel 206b may be sized and configured to allow pressure to be relieved in the third seal body volume 205b without allowing sound from the interior volume 209 to travel through the leak channel 206b and into the third seal body volume 205b and thereby degrade the audio signal captured from the third audio feature 110 (which may be a microphone) of the electronic device 100.

Figure 11F:
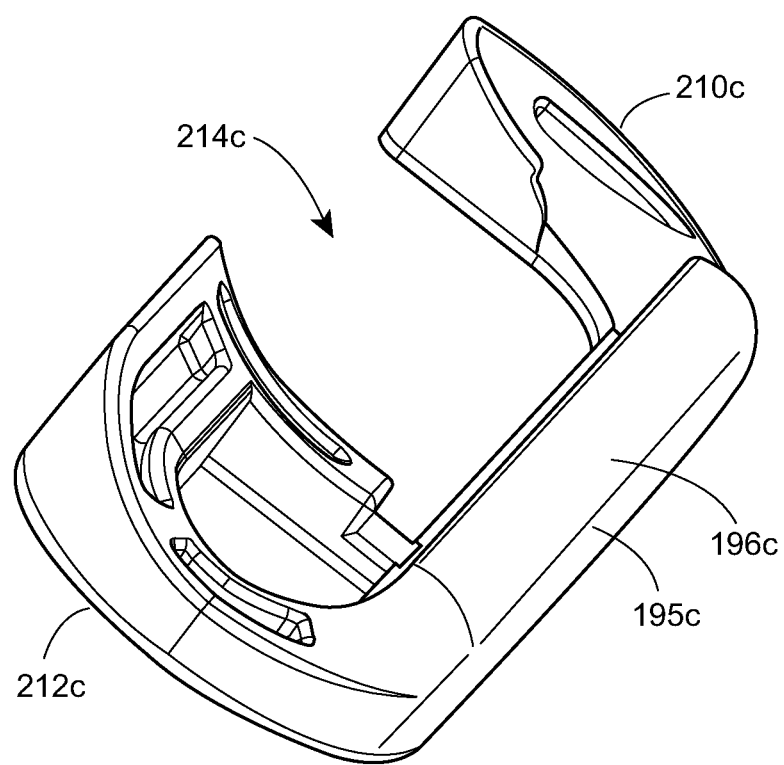
FIG. 11F is an isometric view of a further embodiment of a seal assembly.

FIG. 11F illustrates a perspective view of an additional embodiment of a seal assembly 195c that may be used instead of or in addition to any or all of the previously-discussed embodiments 195a, 195b. The seal assembly 195c may include a seal body 196c that may extend along a seal axis from a first end 210c to a second end 212c, and a cavity portion 214c may be disposed between the first end 210c and the second end 212c. The first end 210c of the seal body 196c may be in sealing engagement with a portion of the electronic device 100 when the electronic device 100 is disposed within the protective enclosure 1 such that the electronic device 100 compresses the seal body 196c along the seal axis to achieve a tight seal. The second end 212c of the seal body 196c may abut, contact, or rest against a portion of the top member 2 and/or the bottom member 3 to provide support against the compressive force provided by the electronic device 100 on the seal body 196c. The seal body 196c (or portions of the seal body 196c) may be made from or comprise a molded silicone or other rubber material (or may be made from a sandwich or a laminate assembly of component parts that include a molded silicone material). Part of the sandwich or laminate forming the seal body 196c may be plastic layers to give structure to the seal body 196c and/or adhesive layers to bond adjacent layers. The seal assembly 195c may include one or more membranes that were described with reference to the seal assemblies 195a, 195b. The seal assembly 195c may also include one or more leak channels that were described with reference to the seal assemblies 195a, 195b, and the one or more leak channels may be disposed on any suitable portion or portions of the seal body 196c.

While various embodiments have been described above, this disclosure is not intended to be limited thereto. Variations can be made to the disclosed embodiments that are still within the scope of the appended claims. One having ordinary skill in the art would recognize that any of the components or features of the protective enclosure 1 described herein may be used in combination with any other (or all) of the components or features of the protective enclosure 1 described herein.

What is claimed is:

1. A protective enclosure for an electronic device having a first audio feature and a second audio feature, the electronic device having a front portion that includes an interactive screen and a back portion opposite the front portion, the protective enclosure comprising:

a top member adapted to receive the front portion of the electronic device, a bottom member adapted to receive the back portion of the electronic device, the top member being releasably secured to the bottom member so as to form a shell that is adapted to at least partially encase the electronic device such that the electronic device is disposed within an interior volume within the shell, a seal assembly disposed in an aperture formed in at least one of the top member and the bottom member, the seal assembly comprising:

a seal body that extends along a seal axis from a first end to a second end, the first end of the seal body adapted to be in engagement with a first portion and a second portion of the electronic device when the electronic device is disposed within the shell such that the electronic device compresses the seal body along the seal axis, the first portion of the of the electronic device surrounding the first audio feature and the second portion of the electronic device surrounding the second audio feature, wherein the seal body defines a first seal aperture extending from the first end of the seal body to the second end of the seal body along the seal axis, the first seal aperture at the first end of the seal body being adapted to surround the first audio feature of the electronic device such that the first end of the seal body is in sealing engagement with the first portion of the electronic device surrounding the first audio feature, wherein the seal body defines a second seal aperture extending from the first end of the seal body to the second end of the seal body along the seal axis, the second seal aperture at the first end of the seal body being adapted to surround the second audio feature of the electronic device such that the first end of the seal body is in sealing engagement with the second portion of the electronic device surrounding the second audio feature;

a first membrane extending across the first seal aperture, wherein a portion of the first seal aperture between the first end of the seal body and the first membrane defines a first seal body volume; and a second membrane extending across the second seal aperture and a portion of the second seal aperture between the first end and the second membrane defines a second seal body volume, wherein a first leak channel extends through the seal body, the first leak channel having a first end open to the second seal body volume and a second end open to the first seal body volume, wherein the first leak channel is sized and configured to allow pressure to be relieved in the second seal body volume without allowing a significant amount of sound from the first seal body volume to travel through the first leak channel and into the second seal body volume.

2. The protective enclosure of claim 1, wherein the seal body is made from a silicone material.

3. The protective enclosure of claim 1, wherein the first seal aperture at the first end of the seal body surrounds the entire first audio feature to form a perimeter around the first audio feature.

4. The protective enclosure of claim 1, wherein the first membrane and the second membrane are each normal to the seal axis.

5. The protective enclosure of claim 1, wherein the first membrane and the second membrane are each liquid impermeable.

6. The protective enclosure of claim 1, wherein the second seal aperture at the first end of the seal body surrounds the entire second audio feature to form a perimeter around the second audio feature.

7. The protective enclosure of claim 1, wherein the second membrane is disposed at or adjacent to the second end of the seal body.

8. The protective enclosure of claim 1, wherein the first membrane extends across the first seal aperture between the first end of the seal body and the second end of the seal body.

9. The protective enclosure of claim 1, wherein the first leak channel has a diameter between 0.25 mm and 0.50 mm.

10. The protective enclosure of claim 1, wherein the first leak channel extends normal to the seal axis.

11. The protective enclosure of claim 1, wherein a second leak channel extends through the seal body, a first end of the second leak channel being open to the second seal body volume and a second end of the second leak channel being open to the interior volume within the shell.

12. The protective enclosure of claim 1, wherein the second end of the seal body abuts a portion of the top member and/or the bottom member to provide support against a compressive force provided by the electronic device.

13. The protective enclosure of claim 5, wherein at least one of the first membrane and the second membrane is air-impermeable.

14. A protective enclosure for an electronic device having a first audio feature, the electronic device having a front portion that includes an interactive screen and a back portion opposite the front portion, the protective enclosure comprising:

a top member adapted to receive the front portion of the electronic device, a bottom member adapted to receive the back portion of the electronic device, the top member being releasably secured to the bottom member so as to form a shell that is adapted to encase the electronic device such that the electronic device is disposed within an interior volume within the shell, a seal assembly disposed in an aperture formed in at least one of the top member and the bottom member, the seal assembly comprising:

a seal body that extends along a seal axis from a first end to a second end, the first end of the seal body adapted to be in engagement with a first portion of the electronic device when the electronic device is disposed within the shell such that the electronic device compresses the seal body along the seal axis, the first portion of the of the electronic device surrounding the first audio feature, wherein the seal body defines a first seal aperture extending from the first end of the seal body to the second end of the seal body along the seal axis, the first seal aperture at the first end of the seal body being adapted to surround the first audio feature of the electronic device such that the first end of the seal body is in sealing engagement with the first portion of the electronic device surrounding the first audio feature, a first membrane extending across the first seal aperture, wherein a portion of the first seal aperture between the first end of the seal body and the first membrane defines a first seal body volume, wherein the first membrane is air-impermeable; and wherein a first leak channel extends through the seal body, the first leak channel having a first end open to the interior volume within the shell and a second end open to the first seal body volume, wherein the first leak channel is sized and configured to allow pressure to be relieved in the first seal body volume without allowing a significant amount of sound from the interior volume to travel through the first leak channel and into the first seal body volume.

15. The protective enclosure of claim 14, wherein the seal body is made from a silicone material.

16. The protective enclosure of claim 14, wherein the first seal aperture at the first end of the seal body surrounds the entire first audio feature to form a perimeter around the first audio feature.

17. The protective enclosure of claim 14, wherein the first membrane is normal to the seal axis.

18. The protective enclosure of claim 14, wherein the first membrane is liquid impermeable.

19. The protective enclosure of claim 14, wherein the first membrane is disposed at or adjacent to the second end of the seal body.

20. The protective enclosure of claim 14, wherein the first leak channel has a diameter between 0.25 mm and 0.50 mm.

21. The protective enclosure of claim 14, wherein the second end of the seal body abuts a portion of the top member and/or the bottom member to provide support against a compressive force provided by the electronic device.

* * * * *